(12) United States Patent
Golden et al.

(10) Patent No.: US 7,695,545 B2
(45) Date of Patent: Apr. 13, 2010

(54) ADSORPTION PROCESS TO RECOVER HYDROGEN FROM FEED GAS MIXTURES HAVING LOW HYDROGEN CONCENTRATION

(75) Inventors: Timothy Christopher Golden, Allentown, PA (US); Edward Landis Weist, Jr., Macungie, PA (US); Jeffrey Raymond Hufton, Fogelsville, PA (US); Paul Anthony Novosat, Emmaus, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 596 days.

(21) Appl. No.: 11/685,992

(22) Filed: Mar. 14, 2007

(65) Prior Publication Data

US 2008/0223213 A1   Sep. 18, 2008

(51) Int. Cl.
*B01D 53/02* (2006.01)
(52) U.S. Cl. .............................. 95/100; 95/103; 95/148
(58) Field of Classification Search ................ 95/96, 95/100, 103, 148; 96/130
See application file for complete search history.

(56) References Cited

U.S. PATENT DOCUMENTS

| | | | |
|---|---|---|---|
| 3,176,444 A | 4/1965 | Kiyonaga | |
| 3,430,418 A | 3/1969 | Wagner | |
| 3,564,816 A | 2/1971 | Batta | |
| 3,986,849 A | 10/1976 | Fuderer | |
| 4,171,206 A | 10/1979 | Sircar | |
| 4,259,091 A | 3/1981 | Benkmann | |
| 4,340,398 A | 7/1982 | Doshi | |
| 4,381,189 A | 4/1983 | Fuderer | |
| 4,482,361 A | 11/1984 | Whysall | |
| 4,532,192 A | 7/1985 | Baker | |
| 4,761,165 A * | 8/1988 | Stocker et al. ................. | 95/22 |
| 5,015,272 A | 5/1991 | Okada | |
| 5,203,888 A | 4/1993 | Maurer | |
| 5,294,247 A | 3/1994 | Scharpf | |
| 5,330,561 A | 7/1994 | Kumar | |

(Continued)

FOREIGN PATENT DOCUMENTS

GB    2154465    9/1985

OTHER PUBLICATIONS

Lancelin, L., et al. "Hydrogen Purification by Pressure Swing Adsorption," presented in the Hydrogen Symposium of the AFTP, Feb. 26, 1976.

(Continued)

*Primary Examiner*—Robert A Hopkins
(74) *Attorney, Agent, or Firm*—Bryan C. Hoke, Jr.

(57) ABSTRACT

A process for selectively separating hydrogen from at least one more strongly adsorbable component in a plurality of adsorption beds to produce a hydrogen-rich product gas from a low hydrogen concentration feed with a high recovery rate. Each of the plurality of adsorption beds subjected to a repetitive cycle. The process comprises an adsorption step for producing the hydrogen-rich product from a feed gas mixture comprising 5% to 50% hydrogen, at least two pressure equalization by void space gas withdrawal steps, a provide purge step resulting in a first pressure decrease, a blowdown step resulting in a second pressure decrease, a purge step, at least two pressure equalization by void space gas introduction steps, and a repressurization step. The second pressure decrease is at least 2 times greater than the first pressure decrease.

25 Claims, 6 Drawing Sheets

U.S. PATENT DOCUMENTS

| | | |
|---|---|---|
| 5,429,666 A | 7/1995 | Agrawal |
| 5,538,706 A | 7/1996 | Kapoor et al. |
| 6,007,606 A | 12/1999 | Baksh |
| 6,113,672 A | 9/2000 | Kapoor |
| 6,210,466 B1 | 4/2001 | Whysall |
| 6,340,382 B1 | 1/2002 | Baksh |
| 6,454,838 B1 | 9/2002 | Xu |
| 6,503,299 B2 | 1/2003 | Baksh |
| 6,565,628 B2 | 5/2003 | Xu |
| 6,699,307 B1 * | 3/2004 | Lomax, Jr. ............ 95/97 |
| 2004/0229102 A1 | 11/2004 | Jahnke |

OTHER PUBLICATIONS

Ruthven, D.M.; "Principles of Adsorption and Adsorption Processes"; John Wiley & Sons; New York, NY; 1984; pp. 336-342; XP002487257.

* cited by examiner

ADSORPTION PROCESS TO RECOVER HYDROGEN FROM FEED GAS MIXTURES HAVING LOW HYDROGEN CONCENTRATION

STATEMENT REGARDING FEDERALLY SPONSORED RESEARCH OR DEVELOPMENT

This invention was made with government support under Cooperative Agreement Number DE-FC36-01GO11087 between Air Products and Chemicals, Inc. and the U.S. Department of Energy. Such government support does not constitute an endorsement by the U.S. Department of Energy. The U.S. Government has certain rights to this invention.

CROSS-REFERENCE TO RELATED APPLICATIONS

Not applicable.

BACKGROUND

The present invention relates to pressure swing adsorption processes and more particularly to such processes for recovering hydrogen at high recoveries and high purities as an unadsorbed product from a feed gas mixture having relatively low hydrogen concentration.

Pressure swing adsorption processes are well-known for the separation of gas mixtures that contain components with different adsorption characteristics. For example, hydrogen production via pressure swing adsorption is a multi-million dollar industry supplying high purity hydrogen for chemical producing industries, metals refining and other related industries. The hydrogen is typically separated from gas mixtures having high hydrogen concentration, for example from reformers with or without shift reactors.

Typically, gas mixtures containing low hydrogen concentrations are combusted as fuel to recover the heating value from the hydrogen.

There are applications where recovery of hydrogen from feed gas mixtures having low hydrogen concentration would be useful. For example, in a molten carbonate fuel cell, synthesis gas (a gas comprising carbon monoxide and hydrogen) may be passed to an anode compartment while an oxidizing gas, typically air, is passed to the cathode compartment. Exhaust gas from the anode contains unreacted fuel (carbon monoxide and hydrogen) as well as water and carbon dioxide. In order to improve the efficiency of the fuel cell, carbon monoxide and hydrogen can be separated from the carbon dioxide and water and the carbon monoxide and hydrogen can be recycled to the anode as disclosed in U.S. Pat. No. 4,532,192 and U.S. Pat. Publ. 2004/0229102. The carbon dioxide that was separated may be recycled to the cathode since carbon dioxide is required for molten carbonate fuel cells.

It may be desirable to recover pure hydrogen from the exhaust stream of the anode. In this case, the pure hydrogen may be used as fuel to a proton exchange membrane (PEM) fuel cell or could be stored for use in fuel cell vehicles. In this application, the composition of the anode exhaust gas, following the water gas shift reaction, may contain about 70% carbon dioxide, 25% hydrogen, and 5% water, with less than 1% carbon monoxide, nitrogen and methane.

A problem facing the fuel cell industry is to recover a high percentage of hydrogen from feed gas mixtures containing low concentrations of hydrogen. It would be desirable to obtain high purity hydrogen from feed gas mixtures containing low concentrations of hydrogen with high hydrogen recovery.

An option being considered for distributing hydrogen in the future hydrogen economy centers on the separation of dilute hydrogen from natural gas. Hydrogen is produced in low-cost centralized facilities, and is then injected into natural gas pipelines for subsequent transport to distributed refueling stations along the gas pipeline network. High purity $H_2$ is separated from the $H_2$/natural gas mixture at each refueling station. Practical issues limit the $H_2$ content of this gas to less than about twenty percent, with the remaining components consisting of typical natural gas species (e.g., methane, $N_2$, C2+ hydrocarbons).

Recovery of hydrogen from refinery fuel gas is another area of interest. Currently, many refineries are in need of hydrogen for various unit operations including hydrocracking, hydrodesulfurization and reforming. Recovering hydrogen from various low hydrogen concentration feed streams could be an attractive option to building a new hydrogen production plant if appropriate technology existed. Refinery fuel gas is a collection of light gases generated in any number of processing units in the refinery. A typical composition of refinery fuel gas is about 25% hydrogen, about 67% C1-C6 hydrocarbons, about 2% oxygen, about 5% nitrogen, about 1% carbon dioxide and ppm levels of hydrogen sulfide. An efficient process to recover a high purity hydrogen stream from such a feed gas with low hydrogen content would be desirable.

Prior art teaches that pressure swing adsorption is not suitable for recovering hydrogen from feed gas mixtures containing low hydrogen concentrations. For example, Lancelin et al., "Hydrogen Purification by Pressure Swing Adsorption," presented at the Hydrogen Symposium of the AFTP, 26 Feb. 1976) show a plot of hydrogen recovery as a function of the hydrogen concentration in the feed gas mixture using pressure swing adsorption. The plot shows a hydrogen recovery of about 80% for 70% hydrogen in the feed gas mixture, decreasing to about 60% hydrogen recovery for 50% hydrogen in the feed gas mixture.

BRIEF SUMMARY

As described herein, the inventors have discovered a high recovery process for recovering hydrogen from feed gas mixtures containing low hydrogen concentrations using pressure swing adsorption.

A process for selectively separating hydrogen from at least one more strongly adsorbable component in a plurality of adsorption beds each containing an adsorbent selective for the at least one more strongly adsorbable component to produce a hydrogen-rich product gas is disclosed. Each of the plurality of adsorption beds is subjected to a repetitive cycle. The process comprises:

(a) an adsorption step for producing the hydrogen-rich product from a feed gas mixture comprising 5% to 50% hydrogen, or 5% to 40% hydrogen, or 5% to 30% hydrogen;

(b) at least two pressure equalization by void space gas withdrawal steps;

(c) a provide purge step resulting in a first pressure decrease $\Delta P_1$;

(d) a blowdown step resulting in a second pressure decrease $\Delta P_2$;

(e) a purge step;

(f) at least two pressure equalization by void space gas introduction steps; and (g) a repressurization step;

wherein $$\frac{\Delta P_2}{\Delta P_1} \geq 2.0$$

or wherein $$\frac{\Delta P_2}{\Delta P_1} \geq 3.0.$$

In the blowdown step, the final blowdown pressure may be 108 kPa to 170 kPa.

At least one of the at least two pressure equalization by void gas introduction steps may be a pressure equalization by void space gas introduction step with hydrogen-rich product gas assistance.

The process may comprise at least three pressure equalization by void space gas withdrawal steps and at least three pressure equalization by void space gas introduction steps. In this instance, $$\frac{\Delta P_2}{\Delta P_1}$$

may be $\geq 4.0$.

Alternatively stated, the process comprises:
(a) introducing a feed gas mixture comprising 5% to 50% hydrogen, or 5% to 40% hydrogen, or 5% to 30% hydrogen at an elevated pressure into a first adsorption bed of the plurality of adsorption beds and adsorbing the at least one more strongly adsorbable component on the adsorbent in the first adsorption bed while withdrawing the hydrogen-rich product gas from the first adsorption bed, thereafter leaving a first void space gas in the first adsorption bed substantially at the elevated pressure;
(b) co-currently withdrawing a first portion of the first void space gas from the first adsorption bed and passing the first portion of the first void space gas to a second adsorption bed of the plurality of adsorption beds for pressure equalization;
(c) co-currently withdrawing a second portion of the first void space gas from the first adsorption bed and passing the second portion of the first void space gas to a third adsorption bed of the plurality of adsorption beds to purge the third adsorption bed with the second portion of the first void space gas resulting in a first pressure decrease in the first adsorption bed from a first pressure $P_1$ to a second pressure $P_2$;
(d) co-currently withdrawing a third portion of the first void space gas from the first adsorption bed and passing the third portion of the first void space gas to one of the third adsorption bed and a fourth adsorption bed of the plurality of adsorption beds for pressure equalization;
(e) counter-currently withdrawing a fourth portion of the first void space gas from the first adsorption bed resulting in a second pressure decrease in the first adsorption bed from the second pressure $P_2$ or a third pressure $P_3$ to a blowdown pressure $P_4$;
wherein $$\frac{(P_2 - P_4)}{(P_1 - P_2)} \geq 2.0 \text{ or } \geq 3.0$$

when the second pressure decrease in the first adsorption bed is from the second pressure $P_2$ to the blowdown pressure $P_4$, and $$\frac{(P_3 - P_4)}{(P_1 - P_2)} \geq 2.0 \text{ or } \geq 3.0$$

when the second pressure decrease in the first adsorption bed is from the third pressure $P_3$ to the blowdown pressure $P_4$;

(f) counter-currently introducing a first portion of a second void space gas into the first adsorption bed for purging the first adsorption bed, the second void space gas from one of a fifth adsorption bed of the plurality of adsorption beds, the second adsorption bed, the third adsorption bed, and the fourth adsorption bed;
(g) counter-currently introducing a second portion of the second void space gas or a portion of a third void space gas into the first adsorption bed from one of a sixth adsorption bed of the plurality of adsorption beds, the second adsorption bed, the third adsorption bed, the fourth adsorption bed and the fifth adsorption bed for pressure equalization;
(h) counter-currently introducing a portion of a fourth void space gas into the first adsorption bed, the fourth void space gas from one of a seventh adsorption bed of the plurality of adsorption beds, the second adsorption bed, the third adsorption bed, the fourth adsorption bed, the fifth adsorption bed and the sixth adsorption bed for pressure equalization; and
(i) at least one of co-currently introducing the feed gas mixture and counter-currently introducing the hydrogen-rich product gas from at least one of a hydrogen-rich product gas storage vessel, an eighth adsorption bed of the plurality of adsorption beds, the second adsorption bed, the third adsorption bed, the fourth adsorption bed, the fifth adsorption bed and the sixth adsorption bed into the first adsorption bed until the first adsorption bed is substantially at the elevated pressure.

Step (c) may be before step (d) or step (d) may be before step (c).

The blowdown pressure $P_4$ may be 108 kPa to 170 kPa.

The second void space gas may be from one of the fourth adsorption bed and the fifth adsorption bed. The third void space gas may be from one of the second adsorption bed, the fourth adsorption bed, and the sixth adsorption bed. The fourth void space gas may be from one of the second adsorption bed, the fourth adsorption bed and the sixth adsorption bed. The hydrogen-rich product gas introduced into the first adsorption bed may be from at least one of the third adsorption bed and the fourth adsorption bed.

The process may further comprise counter-currently introducing the hydrogen-rich product gas from at least one of the second adsorption bed, the third adsorption bed, the fourth adsorption bed, the fifth adsorption bed, the sixth adsorption bed, and the eighth adsorption bed into the first adsorption bed simultaneously with the counter-current introducing of the second portion of the second void space gas or the portion of the third void space gas into the first adsorption bed for pressure equalization with hydrogen-rich product gas assistance. The hydrogen-rich product gas for pressure equalization with hydrogen-rich product gas assistance may be from at least one of the third adsorption bed and the fourth adsorption bed.

The process may further comprise:
j) co-currently withdrawing a fifth portion of the first void space gas from the first adsorption bed and passing the fifth portion of the first void space gas to one of the third adsorption bed and the sixth adsorption bed for pressure equalization; and
(k) counter-currently introducing a portion of a fifth void space gas into the first adsorption bed, the fifth void space gas from one of a ninth adsorption bed of the plurality of adsorption beds, the second adsorption bed, the third adsorption bed, the fourth adsorption bed, the fifth adsorption bed, the sixth adsorption bed, the seventh adsorption bed and the eighth adsorption bed for pressure equalization.

The fifth void space gas may be from one of the second adsorption bed and the third adsorption bed.

In case the process comprises withdrawing a fifth portion of the first void space gas from the first adsorption bed for pressure equalization, $$\frac{(P_2 - P_4)}{(P_1 - P_2)}$$

may be $\geqq 4.0$ when the second pressure decrease in the first adsorption bed is from the second pressure $P_2$ to the blowdown pressure $P_4$ $$\frac{(P_3 - P_4)}{(P_1 - P_2)}$$

and may be $\geqq 4.0$ when the second pressure decrease in the first adsorption bed is from the third pressure $P_3$ to the blowdown pressure $P_4$.

DETAILED DESCRIPTION

Figure 1:
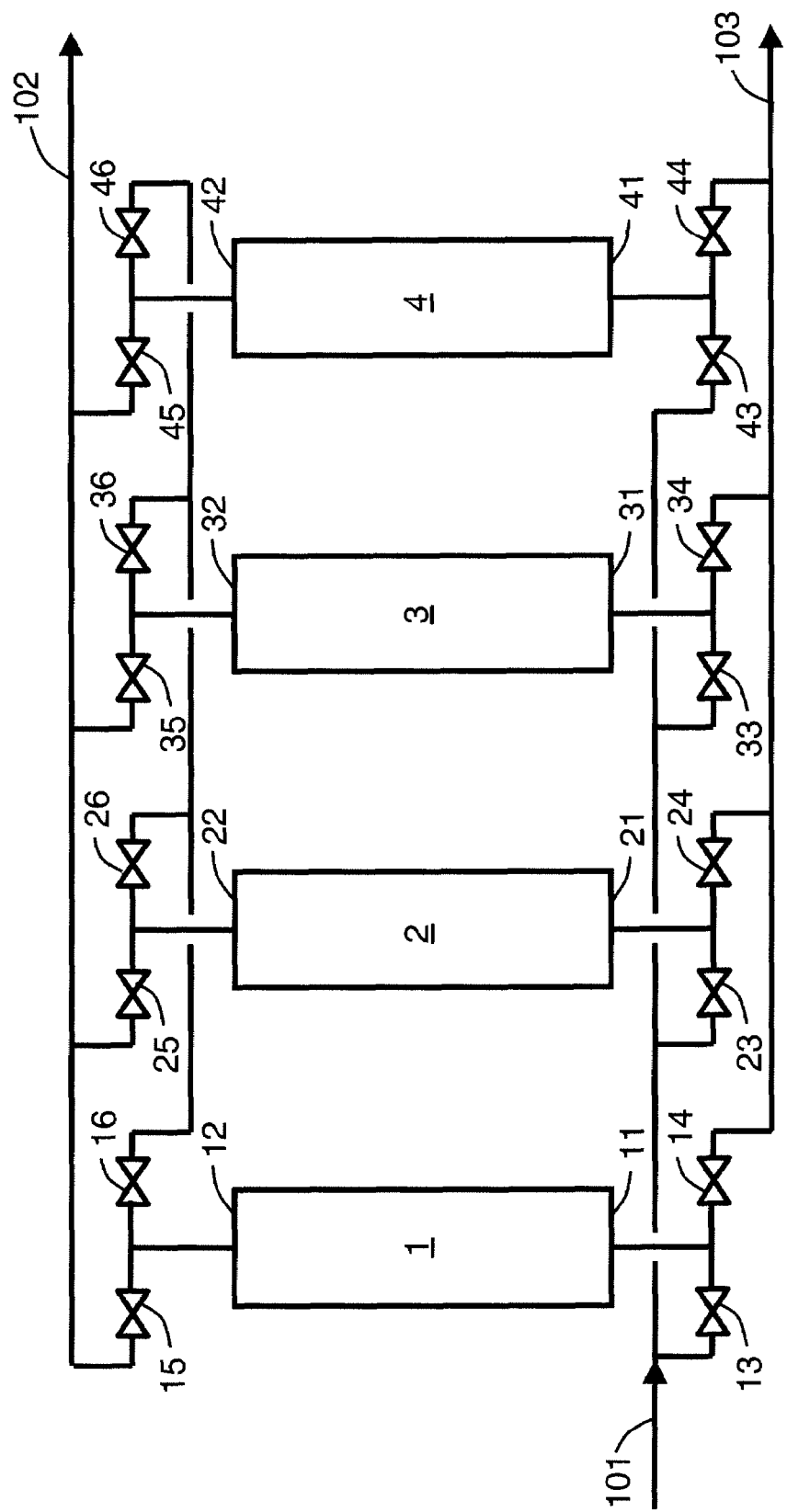
FIG. 1 is a schematic of an adsorption system having four adsorption beds.

The indefinite articles "a" and "an" as used herein mean one or more when applied to any feature in embodiments of the present invention described in the specification and claims. The use of "a" and "an" does not limit the meaning to a single feature unless such a limit is specifically stated. The definite article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

"Hydrogen recovery" is defined as mass flow rate of hydrogen leaving the adsorption system divided by the mass flow rate of hydrogen entering the adsorption system. For example, if a feed stream having a mass flow rate of 100 kg/s with a mass fraction of 0.5 hydrogen enters the adsorption system and a product stream having a mass flow rate of 50 kg/s with a mass fraction of 0.95 hydrogen leaves the adsorption system, the hydrogen recovery is 95%.

As used herein, "plurality" means at least four.

As used herein, concentration percentages are mole percent.

The process described herein relates to a process for selectively separating hydrogen from at least one more strongly adsorbable component in a plurality of adsorption beds each containing an adsorbent selective for the at least one more strongly adsorbable component to produce a hydrogen-rich product gas. Each of the plurality of adsorption beds are subjected to a repetitive cycle of steps.

Suitable adsorbents for separating hydrogen from other gases are well-known in the art. The adsorbent bed may contain multiple layers of various adsorbents. For example, many hydrogen PSA systems include a layer of activated carbon at the feed end of the bed for bulk carbon dioxide and methane removal followed by a layer of zeolite for nitrogen and carbon monoxide removal. In some systems, a layer of activated alumina is placed upstream of the activated carbon layer for water removal resulting in a three layer bed. More recently, a four layer bed for hydrogen purification has been suggested (U.S. Pat. Pub. 2006/0254425). Activated alumina and silica gel are also typical adsorbents used for removal of C3+ hydrocarbons from hydrogen containing streams. Finally, U.S. Pat. No. 3,176,444 provides a list of viable adsorbents that can be used for purification of hydrogen containing streams.

The more strongly adsorbable components may include water, carbon dioxide, carbon monoxide, methane, nitrogen, oxygen, argon, C2-C10 hydrocarbons, sulfur containing gases ($H_2S$, COS, $CS_2$, etc.) and nitrogen containing gases (NO, $NH_3$ etc.). The gas streams could be produced by steam reforming of hydrocarbons, partial oxidation of hydrocarbons, autothermal reforming of hydrocarbons and/or gasification of solids (coal, coke, biomass etc.). The source of the hydrogen-containing stream can also be off-gases from various refinery (e.g. reformer, catalytic cracker etc.) or chemical processes (e.g. ammonia production).

As pressure swing adsorption processes are well-known, one of ordinary skill in the art can construct an adsorption system suitable for carrying out the process described herein. Suitable equipment for carrying out the process is well-known in the art. Operating conditions not specifically disclosed herein suitable for use in the process described herein may be determined by one skilled in the art without undue experimentation.

The process may be carried out in axial adsorbent beds or radial adsorbent beds.

The process may be carried out in a system comprising at least one equalization vessel. As is known in the art, an equalization vessel may be used to store void space gas for equalization with another vessel. This allows one adsorption bed to provide void space gas for another that is out of sequence for direct equalization. This is sometimes called a bed to tank equalization. A process including bed to tank equalization is disclosed in U.S. Pat. No. 6,503,299 to Baksh et al.

The process may use pressure swing adsorption in contrast to vacuum swing adsorption to recover high purity hydrogen in the range of at least 95% hydrogen, and at high hydrogen recovery in the range of at least 80%. Pressure swing adsorption may provide advantages over vacuum swing adsorption. For example, no vacuum pump is required and waste gases from the process may be at sufficient pressure for use as a fuel or for some other purpose.

The process cycle will be described for a first adsorption bed relative to the other adsorption beds. As is known in the art, each of the adsorption beds, in turn, perform the described steps. The process requires at least four adsorption beds. References to fifth, sixth, seventh, and more adsorption beds are applicable only for systems having at least that number of adsorption beds.

Each of the adsorption beds has an "inlet end" and a "discharge end," so termed because of their function during the adsorption step of the adsorption cycle. A feed gas mixture is introduced into the "inlet end" of the adsorption bed and hydrogen-rich product is withdrawn from the "discharge end" during the adsorption step of the cycle. During other steps of the adsorption cycle, gas may be introduced or withdrawn from "inlet end." Likewise, during other steps of the adsorption cycle, gas may be introduced or withdrawn from the "discharge end."

The process comprises introducing a feed gas mixture comprising 5% to 50% hydrogen or 5% to 40% hydrogen, or 5% to 30% hydrogen, at an elevated pressure into a first adsorption bed of the plurality of adsorption beds and adsorbing the at least one more strongly adsorbable component on the adsorbent in the first adsorption bed while withdrawing the hydrogen-rich product from the first adsorption bed. The feed gas mixture is introduced into an inlet end and the hydrogen-rich product is removed from a discharge end. Introducing a feed gas mixture into an adsorption bed, adsorbing more strongly adsorbable components on the adsorbent while withdrawing hydrogen-rich product from the adsorption bed is referred to as the adsorption step and is represented by an "A" in Tables 1, 3, 5, 7 and 9. The adsorption step continues for an adsorption time period thereafter leaving a first void space gas in the first adsorption bed substantially at the elevated pressure. The adsorption time period may be from 3 seconds to 300 seconds.

The elevated pressure may be in the range of 440 kPa (50 psig) to 3.2 MPa (450 psig). Substantially at the elevated pressure means within 10% of the elevated pressure.

At the end of the adsorption step, the adsorption bed contains what is called a void space gas which is a combination of both gas phase and adsorbed phase molecules. The void space gas has a higher average concentration of the more strongly adsorbable components than the feed gas mixture since the hydrogen was withdrawn as a product stream. The concentration of the various components of the void space gas mixture will generally vary as a function of distance from the inlet end to the discharge end of the adsorption bed. The void space gas near the discharge end will generally have a high concentration of hydrogen. The void space gas near the inlet end will generally have a high concentration of the at least one more strongly adsorbable component.

Portions of the void space gas having relatively high hydrogen concentrations are useful for purging other adsorption beds during purge steps and increasing the pressure of other adsorption beds during pressure equalization steps.

Void space gas having high concentration of the at least one more strongly adsorbable component should be removed from the adsorption bed prior to subsequent adsorption steps in the bed.

The direction of flow during other steps is typically described with reference to the direction of flow during the adsorption step. Thus gas flow in the same direction as the gas flow during the adsorption step is "co-current" and gas flow that is counter-current to the gas flow during the adsorption step is "counter-current." Co-currently introducing a gas into an adsorption bed means to introduce the gas in the same direction as the gas during the adsorption step. Counter-currently introducing a gas into an adsorption bed means to introduce the gas in a direction counter-current to the direction of the gas flow during the adsorption step. Co-currently withdrawing a gas from an adsorption bed means to withdraw the gas in the same direction as the gas during the adsorption step. Counter-currently withdrawing a gas from an adsorption bed means to withdraw the gas in a direction counter-current to the direction of the gas flow during the adsorption step.

Gas may be simultaneously co-currently introduced to the inlet end and counter-currently introduced to the discharge end. Gas may be simultaneously co-currently withdrawn from discharge end and counter-currently withdrawn from the inlet end.

When gas is withdrawn from an intermediate position to the inlet end and the discharge end, a portion of the gas is co-currently withdrawn and a portion is counter-currently withdrawn. When gas is introduced to an intermediate position to the inlet end and the discharge end, a portion of the gas is co-currently introduced and a portion is counter-currently introduced.

The process comprises co-currently withdrawing a first portion of the first void space gas from the first adsorption bed and passing the first portion of the first void space gas to a second adsorption bed of the plurality of adsorption beds until the first adsorption bed is pressure equalized with the second adsorption bed. The first portion of the first void space gas may be withdrawn from the discharge end of the first adsorption bed. This first portion of the void space gas will generally have a hydrogen concentration greater than 95% or greater than 99% and is therefore useful for increasing the pressure of the second adsorption bed. The step of co-currently withdrawing a first portion of void space gas from an adsorption bed and passing the first portion to another adsorption bed until the beds are pressure equalized is represented by a "1" in Tables 1, 3, 5, 7 and 9.

A step of co-currently withdrawing a portion of void space gas from an adsorption bed and passing to another adsorption bed until the beds are pressure equalized is referred to herein as a pressure equalization by void space gas withdrawal step. Step "1" may then be referred to as a first pressure equalization by void space gas withdrawal step. The pressure equalization by void space gas withdrawal step may occur over a time period of 1 second to 120 seconds.

As defined herein, pressure equalized means that the pressure difference between the adsorption beds is less than 35 kPa (5 psi). Pressure equalization is a step where gas is transferred from one adsorption bed to another until the adsorption beds are pressure equalized, having a pressure difference less than 35 kPa (5 psi) at the end of the step.

The process comprises co-currently withdrawing a second portion of the first void space gas from the first adsorption bed and passing the second portion of the first void space gas to a third adsorption bed of the plurality of adsorption beds to purge the third adsorption bed with the second portion of the first void space gas. The second portion of the first void space gas may be withdrawn from the discharge end of the first adsorption bed. This second portion of the void space gas will generally have a hydrogen concentration greater than 95% or greater than 99% and is therefore useful for purging the third adsorption bed. The second portion of the first void space gas is withdrawn from the first adsorption bed resulting in a first pressure decrease $\Delta P_1$ in the first adsorption bed from a first pressure $P_1$ to a second pressure $P_2$. The step of co-currently withdrawing the second portion of the first void space gas from an adsorption bed and passing the second portion of the first void space gas to another adsorption bed for purging the other adsorption bed is commonly called a provide purge step and is represented by a "PP" in Tables 1, 3, 5, 7 and 9. The provide purge step occurs for a provide purge time period which may be 1 second to 300 seconds.

The process comprises co-currently withdrawing a third portion of the first void space gas from the first adsorption bed and passing the third portion of the first void space gas to one of the third adsorption bed and a fourth adsorption bed of the plurality of adsorption beds until the first adsorption bed is pressure equalized with that adsorption bed to which the third portion was passed. The third portion of the first void space gas may be withdrawn from the discharge end of the first adsorption bed. The third portion of the first void space gas will generally have a hydrogen concentration greater than 95% or greater than 99% and is therefore useful for increasing the pressure of the third adsorption bed or the fourth adsorption bed. The step of co-currently withdrawing the third portion of a void space gas from an adsorption bed and passing the third portion to another adsorption bed until the beds are pressure equalized is represented by a "2" in Tables 1, 3, 5, 7 and 9. Step "2" may be referred to as a second pressure equalization by void space gas withdrawal step. The second pressure equalization by void space gas withdrawal step may occur over a time period of 1 second to 120 seconds.

According to the process described herein and illustrated in the Examples that follow, the second portion may be withdrawn before the third portion is withdrawn, or the third portion may be withdrawn before the second portion is withdrawn. The second pressure equalization by void space gas withdrawal step "2" may be before or after the provide purge step "PP" as desired and may depend on the total number of adsorption beds utilized.

The process comprises withdrawing a fourth portion of the void space gas from the first adsorption bed, resulting in a second pressure decrease $\Delta P_2$ in the first adsorption bed from the second pressure $P_2$ or a third pressure $P_3$ to a blowdown pressure $P_4$. The fourth portion of the void space gas is generally withdrawn counter-currently and may initially have a hydrogen concentration about the same as the feed composition (20 to 25% hydrogen) and then the hydrogen concentration may decrease over time, having an average hydrogen concentration less than 10%. The fourth portion of the void space gas may be withdrawn from the inlet end of the first adsorption bed. The blowdown pressure may be and is generally the lowest pressure of the cycle and may be 108 kPa (1 psig) to 170 kPa (10 psig). The step of withdrawing the fourth portion of the void space gas from an adsorption bed to a blowdown pressure is commonly called a blowdown step and is represented by a "B" in Tables 1, 3, 5, 7 and 9. The blowdown step occurs for a blowdown time period which may be from 1 seconds to 300 seconds.

In case the blowdown step immediately follows the provide purge step, the pressure decrease during the blowdown step is from $P_2$ to $P_4$. In case there is a step between the provide purge step and the blowdown step, the pressure decrease may be from $P_3$ to $P_4$, where $P_3$ is different than $P_2$.

In the process, $$\frac{(P_2 - P_4)}{(P_1 - P_2)} \geq 2.0 \text{ or } \geq 3.0$$

when the second pressure decrease in the first adsorption bed is from the second pressure $P_2$ to the blowdown pressure $P_4$, and $$\frac{(P_3 - P_4)}{(P_1 - P_2)} \geq 2.0 \text{ or } \geq 3.0$$

when the second pressure decrease in the first adsorption bed is from the third pressure $P_3$ to the blowdown pressure $P_4$. This means that the pressure decrease in the blowdown step is at least two times greater or at least three times greater than the pressure decrease during the provide purge step.

The process comprises counter-currently introducing a portion of a second void space gas into the first adsorption bed for purging the first adsorption bed. The portion of the second void space gas may be introduced into the discharge end of the first adsorption bed. The second void space gas may be provided by any of the other adsorption beds in suitable cycle relationship to the first adsorption bed. The second void space gas may be from the second adsorption bed, the third adsorption bed, the fourth adsorption bed or a fifth adsorption bed of the plurality of adsorption beds. The step of introducing void space gas for purging an adsorption bed is commonly called a purge step and is represented by "P" in Tables 1, 3, 5, 7 and 9. The adsorption bed providing the second void space gas is in a provide purge step, described above. An adsorption bed undergoes the purge step for the same time period that the adsorption bed that is providing the purge gas undergoes the provide purge step.

The process comprises counter-currently introducing another portion of the second void space gas or a portion of a third void space gas into the first adsorption bed. The second or third void space gas may be introduced into the discharge end of the first adsorption bed. The second void space gas is provided by the same adsorption bed that provided void space gas in the purge step. The third void space gas may be provided by any of the other adsorption beds in suitable cycle relationship to the first adsorption bed. The third void space gas may be from the second adsorption bed, the third adsorption bed, the fourth adsorption bed, the fifth adsorption bed or a sixth adsorption bed of the plurality of adsorption beds. Void space gas is introduced until the first adsorption bed is pressure equalized with the adsorption bed that provided the second void space gas or the third void space gas.

A step of counter-currently introducing a portion of void space gas to an adsorption bed from another adsorption bed until the beds are pressure equalized is referred to herein as a pressure equalization by void space gas introduction step. This step occurs in combination with another bed undergoing a second pressure equalization by void space gas withdrawal step "2". This step is therefore referred to as a second pressure equalization by void space gas introduction step and is represented by a "2'" in Tables 1, 3, 5, 7 and 9. An adsorption bed undergoes the second pressure equalization by void space gas introduction step for the same time period that the adsorption bed that is providing the void space gas undergoes the second pressure equalization by void space gas withdrawal step.

The process comprises counter-currently introducing a portion of a fourth void space gas into the first adsorption bed. The fourth void space gas may be introduced into the discharge end of the first adsorption bed. The fourth void space gas may be provided by any of the other adsorption beds and may have a hydrogen concentration greater than 99%. The fourth void space gas may be from the second adsorption bed, the third adsorption bed, the fourth adsorption bed, the fifth adsorption bed or a seventh adsorption bed of the plurality of adsorption beds.

Void space gas is introduced until the first adsorption bed is pressure equalized with the adsorption bed that provided the fourth void space gas. This is also a pressure equalization by void space gas introduction step. This step occurs in combination with another bed undergoing a first pressure equalization by void space gas withdrawal step "1." This step is therefore referred to as a first pressure equalization by void space gas introduction step and is represented by a "1'" in Tables 1, 3, 5, 7 and 9. An adsorption bed undergoes the first pressure equalization by void space gas introduction step for the same time period that the adsorption bed that is providing the void space gas undergoes the first pressure equalization by void space gas withdrawal step.

Hydrogen-rich product gas may be introduced along with the fourth void space gas. The hydrogen-rich product gas may be provided by any of the other adsorption vessels undergoing the adsorption step. This step is a specific version of the pressure equalization by void space gas introduction step called a pressure equalization by void space gas introduction step with hydrogen-rich product gas assistance.

The first adsorption bed is then repressurized to substantially the elevated pressure. The feed gas mixture and/or the hydrogen-rich product gas may be used to repressurize the adsorption bed. The process comprises at least one of co-currently introducing the feed gas mixture and counter-currently introducing the hydrogen-rich product gas until the first adsorption bed is substantially at the elevated pressure. The hydrogen-rich product gas may come from at least one of a hydrogen-rich product gas storage vessel and any of the other adsorption beds, for example, the second adsorption bed, the third adsorption bed, the fourth adsorption bed, the fifth adsorption bed and the sixth adsorption bed. A step of introducing the feed gas mixture and/or hydrogen-rich product gas is commonly called a repressurization step and is represented by an "R" in Tables 1, 3, 5, 7 and 9. The time period for the repressurization step may be 1 seconds to 300 seconds.

Depending on sequencing of the adsorption beds, the process may also include one or more idle steps. In an idle step, gas is neither introduced or withdrawn from the adsorption bed. An idle step is represented by an "I" in Tables 1, 3, 5, 7 and 9. An idle step may have a time period of 1 seconds to 120 seconds.

Optionally, the process may include a third pressure equalization by void gas withdrawal step and a third pressure equalization by void gas introduction step. The third pressure equalization by void gas withdrawal step is represented by "3" in Tables 5 and 9. The third pressure equalization by void gas introduction step is represented by "3'" in Tables 5 and 9.

The optional third pressure equalization by void gas withdrawal step comprises co-currently withdrawing a fifth portion of the void space gas from the first adsorption bed and passing the fifth portion of the first void space gas to another adsorption bed for pressure equalization therewith. The fifth portion of the first void space gas may be withdrawn from the discharge end of the first adsorption bed. The fifth portion of the first void space gas may be passed to one of the fourth adsorption bed, the fifth adsorption bed, the sixth adsorption bed, the seventh adsorption bed or an eighth adsorption bed. The optional third pressure equalization by void space gas withdrawal step may occur over a time period of 1 seconds to 120 seconds.

The optional third pressure equalization by void gas introduction step comprises counter-currently introducing a portion of a fifth void space gas into the first adsorption bed. The fifth void space gas may be introduced into the discharge end of the first adsorption bed. The fifth void space gas may be provided by any of the other adsorption beds and may have a hydrogen concentration greater than 99%. The fifth void space gas may be from the second adsorption bed, the third adsorption bed, the fourth adsorption bed, the fifth adsorption bed, the sixth adsorption bed, the seventh adsorption bed or the eighth adsorption bed. Void space gas is introduced until the first adsorption bed is pressure equalized with the adsorption bed that provided the fifth void space gas. An adsorption bed undergoes the optional third pressure equalization by void space gas introduction step for the same time period that the adsorption bed that is providing the void space gas undergoes the optional third pressure equalization by void space gas withdrawal step.

In case of the optional third pressure equalization by void gas withdrawal step and the optional third pressure equalization by void gas introduction step, $$\frac{(P_2 - P_4)}{(P_1 - P_2)}$$

may be $\geq 4.0$ when the second pressure decrease in the first adsorption bed is from the second pressure $P_2$ to the blowdown pressure $P_4$, and $$\frac{(P_3 - P_4)}{(P_1 - P_2)}$$

may be $\geq 4.0$ when the second pressure decrease in the first adsorption bed is from the third pressure $P_3$ to the blowdown pressure $P_4$.

According to the process described herein and illustrated in the Examples that follow, the second portion of the first void space gas may be withdrawn before the fifth portion of the first void space gas is withdrawn, or the fifth portion may be withdrawn before the second portion is withdrawn. The third pressure equalization by void space gas withdrawal step "3" may be before or after the provide purge step "PP" as desired and may depend on the total number of adsorption beds utilized.

Computational simulation results are provided in the examples that follow to illustrate the process and are not intended to limit the scope of the claims that follow. In all of the examples, the adsorbent in the adsorption beds was activated carbon and the bed height was 1.524 m (5 ft.). The feed gas mixture was provided at about 1.5 MPa (200 psig) and 37.8° C. (100° F.). The hydrogen product purity was controlled to provide about 50 ppm nitrogen, which generally yielded less than 1 ppm methane. For some of the highest purge rate simulations with 20% hydrogen in the feed, methane concentrations were limited to less than 20 ppm methane. The time period for the adsorption step was 60 seconds. In the repressurization step, hydrogen-rich product gas is used to repressurize the adsorption beds without any feed gas repressurization.

EXAMPLE 1

Table 1 shows a cycle chart for a four adsorption bed system that can be used in accordance with the process described herein. In this four bed example, the adsorption beds undergo an adsorption step, a first pressure equalization by void gas withdrawal step, a provide purge step, a second pressure equalization by void gas withdrawal step, a blowdown step, a purge step, a second pressure equalization by void gas introduction step, a first pressure equalization by void gas introduction step with hydrogen-rich product gas assistance, and a repressurization step. According to the example cycle in Table 1, the provide purge step is before the second pressure equalization by void gas withdrawal step.

TABLE 1

| A  | A  | A  | 1  | PP | 2  | B  | P  | 2' | 1' | R  | R  |
|----|----|----|----|----|----|----|----|----|----|----|----|
| B  | P  | 2' | 1' | R  | R  | A  | A  | A  | 1  | PP | 2  |
| 1  | PP | 2  | B  | P  | 2' | 1' | R  | R  | A  | A  | A  |
| 1' | R  | R  | A  | A  | A  | 1  | PP | 2  | B  | P  | 2' |

FIG. 1 is a schematic of an example four adsorption bed system that can be used in accordance with the process described herein and is a basis for simulations in this example. According to the cycle chart in Table 1, when adsorption bed 1 was undergoing step A, adsorption bed 2 was undergoing step B, adsorption bed 3 was undergoing step 1, and adsorption bed 4 was undergoing a step 1'. Feed gas mixture 101 was introduced via open valve 13 to the inlet end 11 of adsorption bed 1. The more strongly adsorbable components are retained in the adsorption bed and hydrogen-rich product gas was discharged from the discharge end 12 of the adsorption bed 1 and through open valve 15 to form product gas 102. Valves 14 and 16 were closed during the adsorption step of adsorption bed 1.

When adsorption bed 2 is undergoing step B, valves 23, 25 and 26 were closed and void gas was withdrawn from the inlet end 21 of adsorption bed 2 via open valve 24 and leaves the system as waste gas 103. When adsorption bed 3 was undergoing step 1 and adsorption bed 4 was undergoing step 1', void gas was withdrawn from adsorption bed 3 through the discharge end 32 via valve 36 and introduced to adsorption bed 4 through the discharge end 42 via valve 46. In the simulations, product assist was used where hydrogen-rich product gas was simultaneously introduced into adsorption bed 4 via valve 45. Valves 33, 34, 35, 43 and 44 were closed.

According to Table 1, adsorption bed 1 continues on step A while adsorption bed 2 switches to step P, adsorption bed 3 switches to step PP, and adsorption bed 4 switches to step R. When adsorption bed 2 was undergoing step P and adsorption bed 3 was undergoing step PP, void gas was withdrawn from adsorption bed 3 through the discharge end 32 via valve 36 and introduced into adsorption bed 2 through the discharge end 22 via valve 26. Valve 36 was adjusted in the simulations to vary the amount of void space gas that was transferred during the PP step. Void space gas was removed from adsorption bed 2 through inlet end 21 and valve 24 to form waste gas 103. Valves 23, 25, 33, 34 and 35 were closed. When adsorption bed 4 was undergoing step R, hydrogen-rich product gas was used to repressurize adsorption bed 4. Valve 45 was open, while valves 43, 44 and 46 were closed.

Adsorption bed 1 continues on step A, while adsorption bed 2 switches to step 2', adsorption bed 3 switches to step 2 and adsorption bed 4 continues on step R. When adsorption bed 3 was undergoing step 2 and adsorption bed 2 was undergoing step 2', void gas was withdrawn from adsorption bed 3 through the discharge end 32 via valve 36 and introduced to adsorption bed 2 through the discharge end 22 via valve 26. Valves 23, 24, 25, 33, 34, and 35 were closed.

According to the cycle chart in Table 1, while adsorption bed 1 undergoes step 1, adsorption bed 2 undergoes step 1', adsorption bed 3 undergoes step B, and adsorption bed 4 undergoes step A. Feed gas mixture 101 was introduced via open valve 43 to the inlet end 41 of adsorption bed 4. Hydrogen-rich product gas was discharged from the discharge end 42 of adsorption bed 4 and through open valve 45 to form product gas 102. Valves 44 and 46 were closed during the adsorption step of adsorption bed 4.

When adsorption bed 3 was undergoing step B, valves 33, 35 and 36 were closed and void gas was withdrawn from the inlet end 31 of adsorption bed 3 via open valve 34 and leaves the system as waste gas 103. When adsorption bed 1 was undergoing step 1 and adsorption bed 2 was undergoing step 1', void gas was withdrawn from adsorption bed 1 through the discharge end 12 via valve 16 and introduced to adsorption bed 2 through the discharge end 22 via valve 26. In the simulations, product assist was used where hydrogen-rich product gas was introduced into adsorption bed 2 via valve 25. Valves 13, 14, 15, 23 and 24 were closed.

According to the cycle chart in Table 1, adsorption bed 4 continues on step A while adsorption bed 3 switches to step P, adsorption bed 1 switches to step PP, and adsorption bed 2 switches to step R. When adsorption bed 3 was undergoing step P and adsorption bed 1 was undergoing step PP, void gas was withdrawn from adsorption bed 1 through the discharge end 12 via valve 16 and introduced into adsorption bed 3 through the discharge end 32 via valve 36. Valve 16 was adjusted in the simulations to vary the amount of void space gas that was transferred during the PP step. Void space gas was removed from adsorption bed 3 through inlet end 31 and valve 34 to form waste gas 103. Valves 33, 35, 13, 14, and 15 were closed. When adsorption bed 2 was undergoing step R, hydrogen-rich product gas was used to repressurize adsorption bed 2. Valve 25 was open, while valves 23, 24 and 26 were closed.

Adsorption bed 4 continues on step A, while adsorption bed 3 switches to step 2', adsorption bed 1 switches to step 2 and adsorption bed 2 continues on step R. When adsorption bed 1 was undergoing step 2 and adsorption bed 3 was undergoing step 2', void gas was withdrawn from adsorption bed 1 through the discharge end 12 via valve 16 and introduced to adsorption bed 3 through the discharge end 32 via valve 36. Valves 13, 14, 15, 33, 34, and 35 were closed.

While adsorption bed 4 undergoes step 1, adsorption bed 3 undergoes step 1', adsorption bed 1 undergoes step B, and adsorption bed 2 undergoes step A. Feed gas mixture 101 was introduced via open valve 23 to the inlet end 21 of adsorption bed 2. Hydrogen-rich product gas was discharged from the discharge end 22 of adsorption bed 2 and through open valve 25 to form product gas 102. Valves 24 and 26 were closed during the adsorption step of adsorption bed 2.

When adsorption bed 1 was undergoing step B, valves 13, 15 and 16 were closed and void gas was withdrawn from the inlet end 11 of adsorption bed 1 via open valve 14 and leaves the system as waste gas 103. When adsorption bed 4 was undergoing step 1 and adsorption bed 3 was undergoing step 1', void gas was withdrawn from adsorption bed 4 through the discharge end 42 via valve 46 and introduced to adsorption bed 3 through the discharge end 32 via valve 36. In the simulations, product assist was used where hydrogen-rich product gas was introduced into adsorption bed 3 via valve 35. Valves 43, 44, 45, 33, and 34 were closed.

According to the cycle chart in Table 1, adsorption bed 2 continues on step A while adsorption bed 1 switches to step P, adsorption bed 4 switches to step PP, and adsorption bed 3 switches to step R. When adsorption bed 1 was undergoing step P and adsorption bed 4 was undergoing step PP, void gas was withdrawn from adsorption bed 4 through the discharge end 42 via valve 46 and introduced into adsorption bed 1 through the discharge end 12 via valve 16. Valve 46 was adjusted in the simulations to vary the amount of void space gas that was transferred during the PP step. Void space gas was removed from adsorption bed 1 through inlet end 11 and valve 14 to form waste gas 103. Valves 13, 15, 43, 44, and 45 were closed. When adsorption bed 3 was undergoing step R, hydrogen-rich product gas was used to repressurize adsorption bed 3. Valve 35 was open, while valves 33, 34 and 36 were closed.

According to the cycle chart in Table 1, adsorption bed 2 continues on step A, while adsorption bed 1 switches to step 2', adsorption bed 4 switches to step 2 and adsorption bed 3 continues on step R. When adsorption bed 4 was undergoing step 2 and adsorption bed 1 was undergoing step 2', void gas was withdrawn from adsorption bed 4 through the discharge end 42 via valve 46 and introduced to adsorption bed 1 through the discharge end 12 via valve 16. Valves 13, 14, 15, 43, 44, and 45 were closed.

According to the cycle chart in Table 1, while adsorption bed 2 undergoes step 1, adsorption bed 1 undergoes step 1', adsorption bed 4 undergoes step B, and adsorption bed 3 undergoes step A. Feed gas mixture 101 was introduced via open valve 33 to the inlet end 31 of adsorption bed 3. Hydrogen-rich product gas was discharged from the discharge end 32 of adsorption bed 3 and through open valve 35 to form product gas 102. Valves 34 and 36 were closed during the adsorption step of adsorption bed 3.

When adsorption bed 4 was undergoing step B, valves 43, 45 and 46 were closed and void gas was withdrawn from the inlet end 41 of adsorption bed 4 via open valve 44 and leaves the system as waste gas 103. When adsorption bed 2 was undergoing step 1 and adsorption bed 1 was undergoing step 1', void gas was withdrawn from adsorption bed 2 through the discharge end 22 via valve 26 and introduced to adsorption bed 1 through the discharge end 12 via valve 16. In the simulations, product assist was used where hydrogen-rich product gas was introduced into adsorption bed 1 via valve 15. Valves 23, 24, 25, 13, and 14 were closed.

According to the cycle chart in Table 1, adsorption bed 3 continues on step A while adsorption bed 4 switches to step P, adsorption bed 2 switches to step PP, and adsorption bed 1 switches to step R. When adsorption bed 4 was undergoing step P and adsorption bed 2 was undergoing step PP, void gas was withdrawn from adsorption bed 2 through the discharge end 22 via valve 26 and introduced into adsorption bed 4 through the discharge end 42 via valve 46. Valve 26 was adjusted in the simulations to vary the amount of void space gas that was transferred during the PP step. Void space gas was removed from adsorption bed 4 through inlet end 41 and valve 44 to form waste gas 103. Valves 43, 45, 23, 24, and 25 were closed. When adsorption bed 1 was undergoing step R, hydrogen-rich product gas was used to repressurize adsorption bed 1. Valve 15 was open, while valves 13, 14 and 16 were closed.

According to the cycle chart in Table 1, adsorption bed 3 continues on step A, while adsorption bed 4 switches to step 2', adsorption bed 2 switches to step 2 and adsorption bed 1 continues on step R. When adsorption bed 2 was undergoing step 2 and adsorption bed 4 was undergoing step 2', void gas was withdrawn from adsorption bed 2 through the discharge end 22 via valve 26 and introduced to adsorption bed 4 through the discharge end 42 via valve 46. Valves 23, 24, 25, 43, 44, and 45 were closed.

For purposes of comparison, simulations for two different feed gas mixtures are presented. Results of simulations using a feed gas mixture comprising 80% hydrogen, 19.7% methane and 0.3% nitrogen are presented to illustrate expected trends for processing feed gas mixtures having high hydrogen concentrations. Results of simulations using a feed gas mixture comprising 20% hydrogen, 78.6% methane and 1.4% nitrogen are presented to illustrate trends discovered by the inventors for processing feed gas mixtures having low hydrogen concentrations.

In the simulations, the valve setting for the bed providing purge gas was adjusted to vary the ratio of the pressure decrease during the blowdown step and the pressure decrease during the provide purge step. For each simulation, the final blowdown pressure was set at about 140 kPa. The approach pressure on the equalization steps was set at 10 kPa. As part of the solution of the simulation, the pressure at the end of each equalization step was determined.

Pressure at the end of each step for four cases with feed gas mixtures comprising 20% hydrogen are given in Table 2. The pressure units are MPa. The ratio of pressure decrease during the blowdown step to the pressure decrease during the provide purge step, $$\left(\frac{\Delta P_B}{\Delta P_{PP}}\right),$$

is also listed.

TABLE 2

| | Step | | | | | | | | | |
|---|---|---|---|---|---|---|---|---|---|---|
| Case | A | 1 | PP | 2 | B | P | 2' | 1' | R | $\left(\frac{\Delta P_B}{\Delta P_{PP}}\right)$ |
| 1 | 1.48 | 0.97 | 0.66 | 0.38 | 0.14 | 0.13 | 0.37 | 0.96 | 1.44 | 0.79 |
| 2 | 1.48 | 1.01 | 0.85 | 0.46 | 0.14 | 0.13 | 0.45 | 1.00 | 1.44 | 2.05 |
| 3 | 1.48 | 1.02 | 0.91 | 0.49 | 0.14 | 0.14 | 0.48 | 1.01 | 1.44 | 3.19 |
| 4 | 1.48 | 1.04 | 0.98 | 0.52 | 0.14 | 0.14 | 0.51 | 1.03 | 1.44 | 6.65 |

Figure 2:
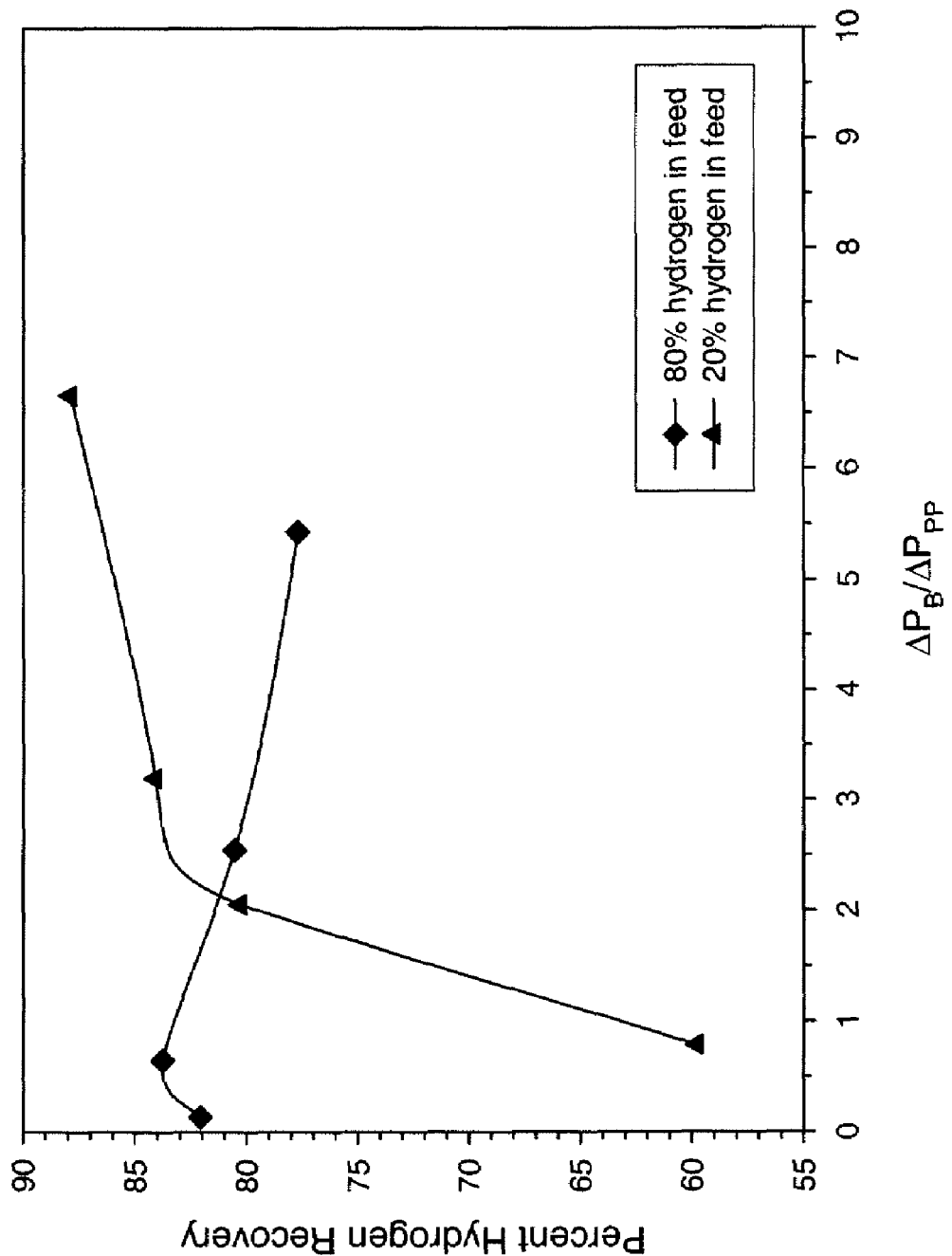
FIG. 2 is a plot of percent hydrogen recovery as a function of the ratio of the pressure decrease during the blowdown step and the pressure decrease during the provide purge step for a system having four adsorption beds and two equalization steps.

FIG. 2 presents results of simulations for feed gas mixtures comprising 80% hydrogen showing percent hydrogen recovery as a function of the ratio of pressure decrease during the blowdown step to the pressure decrease during the provide purge step for the four adsorption bed system utilizing the cycle chart in Table 1. The results show the expected trend that the hydrogen recovery decreases as the ratio of pressure decrease during the blowdown step to the pressure decrease during the provide purge step increases. FIG. 2 shows that in order to have a hydrogen recovery greater than about 80% for a feed gas mixture comprising 80% hydrogen, the ratio of the pressure decrease during the blowdown step to the pressure decrease during the provide purge step should be less than about 3.

This is consistent with prior art with four adsorption beds. For example, U.S. Pat. No. 3,430,418 to Wagner discloses a ratio of pressure decrease during the blowdown step to the pressure decrease during the provide purge of 0.83. U.S. Pat. No. 3,564,816 to Batta discloses a ratio of pressure decrease during the blowdown step to the pressure decrease during the provide purge of 0.82. U.S. Pat. No. 4,340,398 to Doshi et al. discloses a ratio of pressure decrease during the blowdown step to the pressure decrease during the provide purge of 0.8. U.S. Pat. No. 6,007,606 to Baksh et al. discloses a ratio of pressure decrease during the blowdown step to the pressure decrease during the provide purge of 1.59. U.S. Pat. No. 6,340,382 to Baksh et al. disclose a ratio of pressure decrease during the blowdown step to the pressure decrease during the provide purge of 1.15.

FIG. 2 also presents results of the simulations for feed gas mixtures comprising 20% hydrogen showing percent hydrogen recovery as a function of the ratio of pressure decrease during the blowdown step to the pressure decrease during the provide purge step for the four adsorption bed system utilizing the cycle in Table 1. The results show that the hydrogen recovery increases above 80% for a ratio greater than about 2. In contrast to the results for the feed gas mixtures comprising 80% hydrogen, the results for the feed gas mixtures comprising 20% hydrogen show that the hydrogen recovery increases as the ratio of pressure decrease during the blowdown step to the pressure decrease during the provide purge step increases.

EXAMPLE 2

Table 3 shows a cycle chart for a five adsorption bed system that can be used in accordance with the process described herein and used in the simulations presented in Example 2. In this five bed example, the adsorption beds undergo an adsorption step, a first pressure equalization by void gas withdrawal step, a second pressure equalization by void gas withdrawal step, a provide purge step, a blowdown step, a purge step, an idle step, a second pressure equalization by void gas introduction step, a second idle step, a first pressure equalization by void gas introduction step with hydrogen-rich product gas assistance, and a repressurization step. According to the example cycle in Table 3, the provide purge step is after the second pressure equalization by void gas withdrawal step.

As in Example 1, computational simulations were performed, but this time for a five adsorption bed system. Valve operation for the various steps is similar to that described in Example 1.

TABLE 3

| A | A | A | 1 | 2 | PP | B | B | P | I | 2' | I | 1' | R | R |
| I | 2' | I | 1' | R | R | A | A | A | 1 | 2 | PP | B | B | P |
| 1 | 2 | PP | B | B | P | I | 2' | I | 1' | R | R | A | A | A |
| B | B | P | I | 2' | I | 1' | R | R | A | A | A | 1 | 2 | PP |
| 1' | R | R | A | A | A | 1 | 2 | PP | B | B | P | I | 2' | I |

For purposes of comparison, simulations for two different feed gas mixtures are presented. Results of simulations using a feed gas mixture comprising 80% hydrogen, 19.7% methane and 0.3% nitrogen are presented to illustrate expected trends for processing feed gas mixtures having high hydrogen concentrations. Results of simulations using a feed gas mixture comprising 20% hydrogen, 78.6% methane and 1.4% nitrogen are presented to illustrate trends discovered by the inventors for processing feed gas mixtures having low hydrogen concentrations.

In the simulations, the valve setting for the bed providing purge gas was adjusted to vary the ratio of the pressure decrease during the blowdown step to the pressure decrease during the provide purge step. For each simulation, the final blowdown pressure was set at about 135 kPa. The approach pressure on the equalization steps was set at about 10 kPa. As part of the solution of the simulation, the pressure at the end of each equalization step was determined.

Pressure at the end of each step for four cases with feed gas mixtures comprising 20% hydrogen are given in Table 4. The pressure units are MPa. The ratio of pressure decrease during the blowdown step to the pressure decrease during the provide purge step, $$\left(\frac{\Delta P_B}{\Delta P_{PP}}\right),$$

is also listed.

TABLE 4

| | Step | | | | | | | | | |
| --- | --- | --- | --- | --- | --- | --- | --- | --- | --- | --- |
| Case | A | 1 | 2 | PP | B | P | 2' | 1' | R | $\left(\frac{\Delta P_B}{\Delta P_{PP}}\right)$ |
| 1 | 1.48 | 1.11 | 0.58 | 0.44 | 0.133 | 0.12 | 0.57 | 1.1 | 1.44 | 2.2 |
| 2 | 1.48 | 1.12 | 0.58 | 0.5 | 0.134 | 0.14 | 0.57 | 1.1 | 1.44 | 4.2 |
| 3 | 1.48 | 1.12 | 0.58 | 0.53 | 0.135 | 0.14 | 0.57 | 1.1 | 1.44 | 6.7 |
| 4 | 1.48 | 1.12 | 0.58 | 0.56 | 0.135 | 0.14 | 0.57 | 1.1 | 1.44 | 14.2 |

Figure 3:
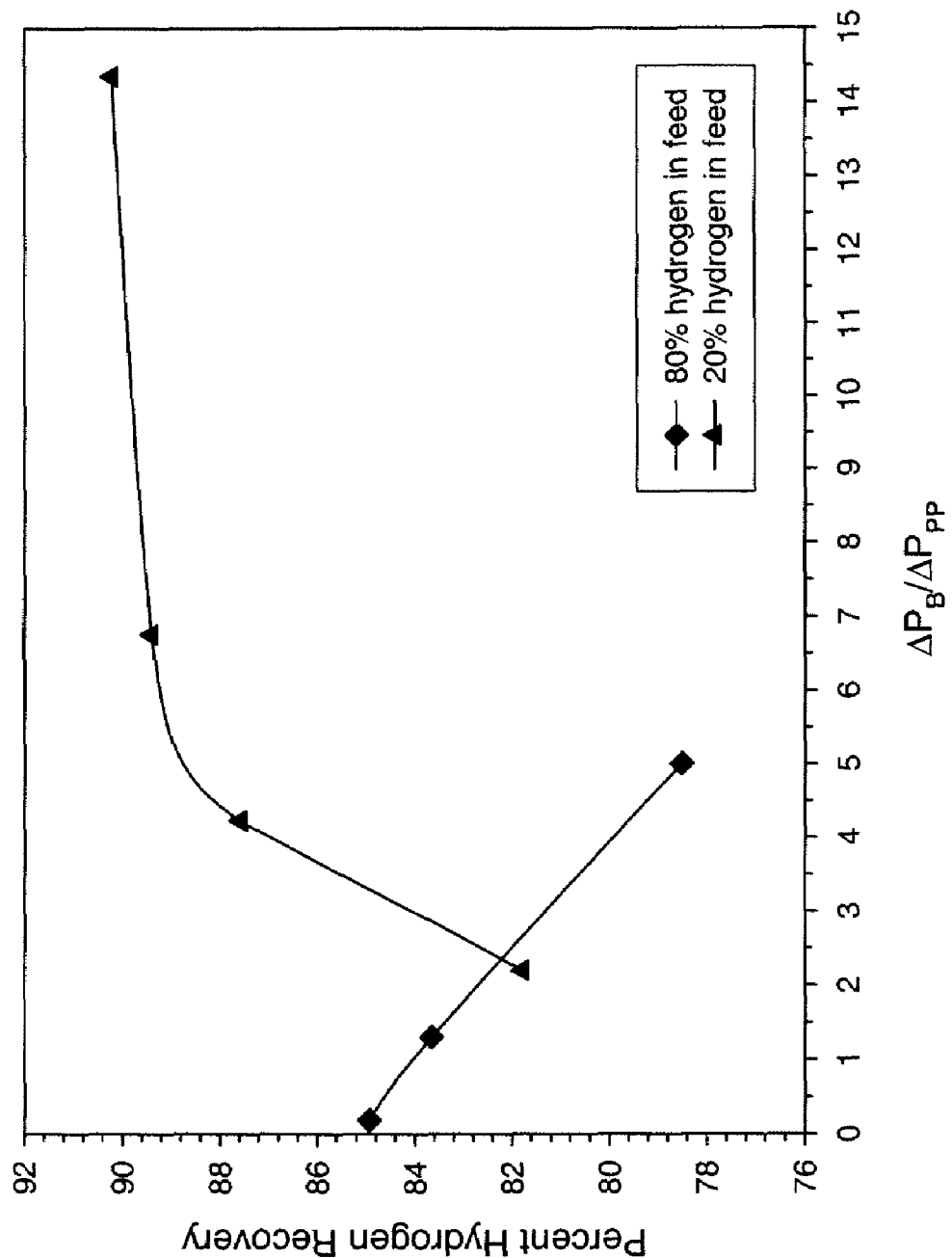
FIG. 3 is a plot of percent hydrogen recovery as a function of the ratio of the pressure decrease during the blowdown step and the pressure decrease during the provide purge step for a system having five adsorption beds and two equalization steps.

FIG. 3 presents results of the computational simulations for feed gas mixtures comprising 80% hydrogen showing percent hydrogen recovery as a function of the ratio of pressure decrease during the blowdown step to the pressure decrease during the provide purge step for the five adsorption bed system utilizing the cycle in Table 4. The results show the expected trend that the hydrogen recovery decreases as the ratio of pressure decrease during the blowdown step to the pressure decrease during the provide purge step increases. The hydrogen recovery decreases from about 85% at a ratio of about 0.2 down to a hydrogen recovery less than 80% at a ratio of about 5.

FIG. 3 also presents results of the simulations for feed gas mixtures comprising 20% hydrogen showing percent hydrogen recovery as a function of the ratio of pressure decrease during the blowdown step to the pressure decrease during the provide purge step for the five adsorption bed system utilizing the cycle in Table 4. The results show that the hydrogen recovery is above 80% for a ratio greater than 2. The hydrogen recovery increases above 88% for a ratio greater than about 5.

In contrast to the results for the feed gas mixtures comprising 80% hydrogen, the results for the feed gas mixtures comprising 20% hydrogen show that the hydrogen recovery increases as the ratio of pressure decrease during the blowdown step to the pressure decrease during the provide purge step increases.

The computational simulations illustrate the desirability to increase the ratio of pressure decrease during the blowdown step to the pressure decrease during the provide purge step for feed gas mixtures comprising low concentrations of hydrogen. The simulations show that for an adsorption system having 5 adsorption bed and a cycle having 2 equalization steps, a ratio greater than 2 is desired for hydrogen recovery greater than 80%, a ratio greater than 4 is desired for hydrogen recovery greater than 87%, and a ratio greater than 7 is desired for a hydrogen recovery greater than 89%.

EXAMPLE 3

Table 5 shows a cycle chart for a five adsorption bed system that can be used in accordance with the process described herein and used in the simulations presented in Example 3. In this five bed example, the adsorption beds undergo an adsorption step, a first pressure equalization by void gas withdrawal step, a second pressure equalization by void gas withdrawal step, a provide purge step, a third pressure equalization by void gas withdrawal step, a blowdown step, a purge step, a third pressure equalization by void gas introduction step, a second pressure equalization by void gas introduction step, an idle step, a first pressure equalization by void gas introduction step with hydrogen-rich product gas assistance, and a repressurization step. According to the example cycle in Table 5, the provide purge step follows the second pressure equalization by void gas withdrawal step and precedes the third pressure equalization by void gas withdrawal step.

As in Example 1, computational simulations were performed. Valve operation for the various steps is similar to that described in Example 1.

TABLE 5

| A | A | A | 1 | 2 | PP | 3 | B | P | 3' | 2' | I | 1' | R | R |
|---|---|---|---|---|---|---|---|---|---|---|---|---|---|---|
| 3' | 2' | I | 1' | R | R | A | A | A | 1 | 2 | PP | 3 | B | P |
| 1 | 2 | PP | 3 | B | P | 3' | 2' | I | 1' | R | R | A | A | A |
| 3 | B | P | 3' | 2' | I | 1' | R | R | A | A | A | 1 | 2 | PP |
| 1' | R | R | A | A | A | 1 | 2 | PP | 3 | B | P | 3' | 2' | I |

For purposes of comparison, simulations for two different feed gas mixtures are presented. Results of simulations using a feed gas mixture comprising 80% hydrogen, 19.7% methane and 0.3% nitrogen are presented to illustrate expected trends for processing feed gas mixtures having high hydrogen concentrations. Results of simulations using a feed gas mixture comprising 20% hydrogen, 78.6% methane and 1.4% nitrogen are presented to illustrate trends discovered by the inventors for processing feed gas mixtures having low hydrogen concentrations.

In the simulations, the valve setting for the bed providing purge gas was adjusted to vary the ratio of the pressure decrease during the blowdown step to the pressure decrease during the provide purge step. For each simulation, the final blowdown pressure was set at about 135 kPa. The approach pressure on the equalization steps was set at about 10 kPa. As part of the solution of the simulation, the pressure at the end of each equalization step was determined.

Pressure at the end of each step for four cases with feed gas mixtures comprising 20% hydrogen are given in Table 6. The pressure units are MPa. The ratio of pressure decrease during the blowdown step to the pressure decrease during the provide purge step, $$\left(\frac{\Delta P_B}{\Delta P_{PP}}\right),$$

is also listed.

TABLE 6

| | Step | | | | | | | | | | | |
|---|---|---|---|---|---|---|---|---|---|---|---|---|
| Case | A | 1 | 2 | PP | 3 | B | P | 3' | 2' | 1' | R | $\left(\frac{\Delta P_B}{\Delta P_{PP}}\right)$ |
| 1 | 1.48 | 1.11 | 0.68 | 0.47 | 0.29 | 0.13 | 0.13 | 0.28 | 0.66 | 1.1 | 1.44 | 0.77 |
| 2 | 1.48 | 1.13 | 0.71 | 0.60 | 0.34 | 0.14 | 0.14 | 0.33 | 0.70 | 1.1 | 1.44 | 1.8 |
| 3 | 1.48 | 1.13 | 0.72 | 0.64 | 0.37 | 0.14 | 0.14 | 0.36 | 0.71 | 1.1 | 1.44 | 2.9 |
| 4 | 1.48 | 1.14 | 0.74 | 0.70 | 0.39 | 0.14 | 0.14 | 0.38 | 0.73 | 1.1 | 1.44 | 6.2 |

Figure 4:
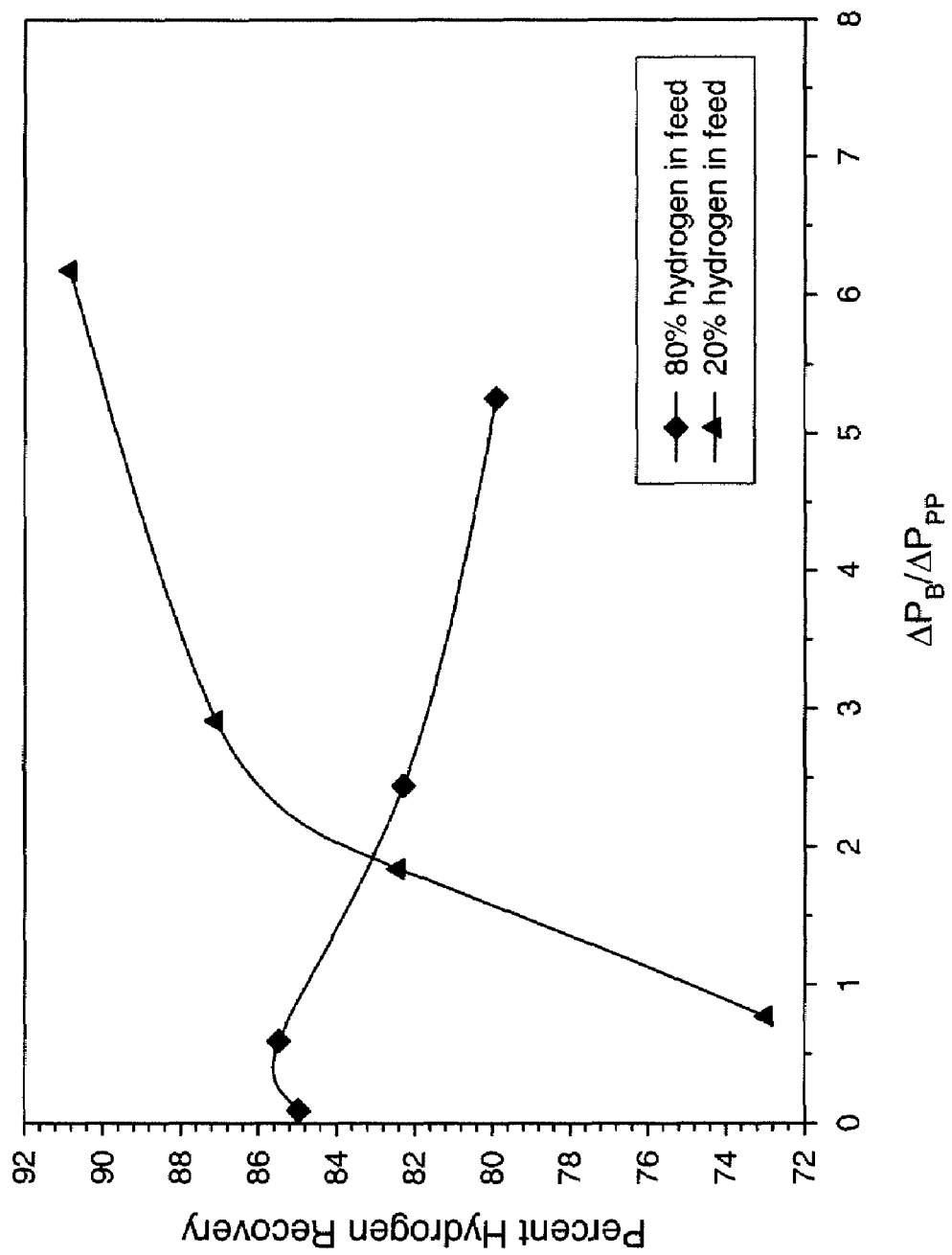
FIG. 4 is a plot of percent hydrogen recovery as a function of the ratio of the pressure decrease during the blowdown step and the pressure decrease during the provide purge step for a system having five adsorption beds and three equalization steps.

FIG. 4 presents results of the computational simulations for feed gas mixtures comprising 80% hydrogen showing percent hydrogen recovery as a function of the ratio of pressure decrease during the blowdown step to the pressure decrease during the provide purge step for the five adsorption bed system utilizing the cycle in Table 5. The results show the expected trend that the hydrogen recovery decreases as the ratio of pressure decrease during the blowdown step to the pressure decrease during the provide purge step increases. The hydrogen recovery decreases from about 85% at a ratio of about 0.6 down to a hydrogen recovery less than 80% at a ratio of about 5.

FIG. 4 also presents results of the simulations for feed gas mixtures comprising 20% hydrogen showing percent hydrogen recovery as a function of the ratio of pressure decrease during the blowdown step to the pressure decrease during the provide purge step for the five adsorption bed system utilizing the cycle in Table 5. The results show that the hydrogen recovery is above 80% for a ratio greater than 2. The hydrogen recovery increases above 88% for a ratio greater than about 5.

In contrast to the results for the feed gas mixtures comprising 80% hydrogen, the results for the feed gas mixtures comprising 20% hydrogen show that the hydrogen recovery increases as the ratio of pressure decrease during the blowdown step to the pressure decrease during the provide purge step increases.

The computational simulations illustrate the desirability to increase the ratio of pressure decrease during the blowdown step to the pressure decrease during the provide purge step for feed gas mixtures comprising low concentrations of hydrogen. The simulations show that for an adsorption system having 5 adsorption bed and a cycle having 3 equalization steps, a ratio greater than 1.6 is desired for hydrogen recovery greater than 80%, a ratio greater than 3 is desired for hydrogen recovery greater than 87%, and a ratio greater than about 5 is desired for a hydrogen recovery greater than 89%.

Comparing these results to Example 2, the required ratio is lower for 3 equalization steps than for 2 equalization steps to provide the same hydrogen recovery.

EXAMPLE 4

Table 7 shows a cycle chart for a six adsorption bed system that can be used in accordance with the process described herein and used in the simulations presented in Example 4. In this six bed example, the adsorption beds undergo an adsorption step, a first pressure equalization by void gas withdrawal step, a second pressure equalization by void gas withdrawal step, a provide purge step, a blowdown step, a purge step, an idle step, a second pressure equalization by void gas introduction step, a second idle step, a first pressure equalization by void gas introduction step with hydrogen-rich product gas assistance, and a repressurization step. According to the example cycle in Table 7, the provide purge step follows the second pressure equalization by void gas withdrawal step.

decrease during the blowdown step to the pressure decrease during the provide purge step. For each simulation, the final blowdown pressure was set at about 135 kPa. The approach pressure on the equalization steps was set at about 10 kPa. As part of the solution of the simulation, the pressure at the end of each equalization step was determined.

Pressure at the end of each step for four cases with feed gas mixtures comprising 20% hydrogen are given in Table 8. The pressure units are MPa. The ratio of pressure decrease during the blowdown step to the pressure decrease during the provide purge step, $$\left(\frac{\Delta P_B}{\Delta P_{PP}}\right),$$

is also listed.

Figure 5:
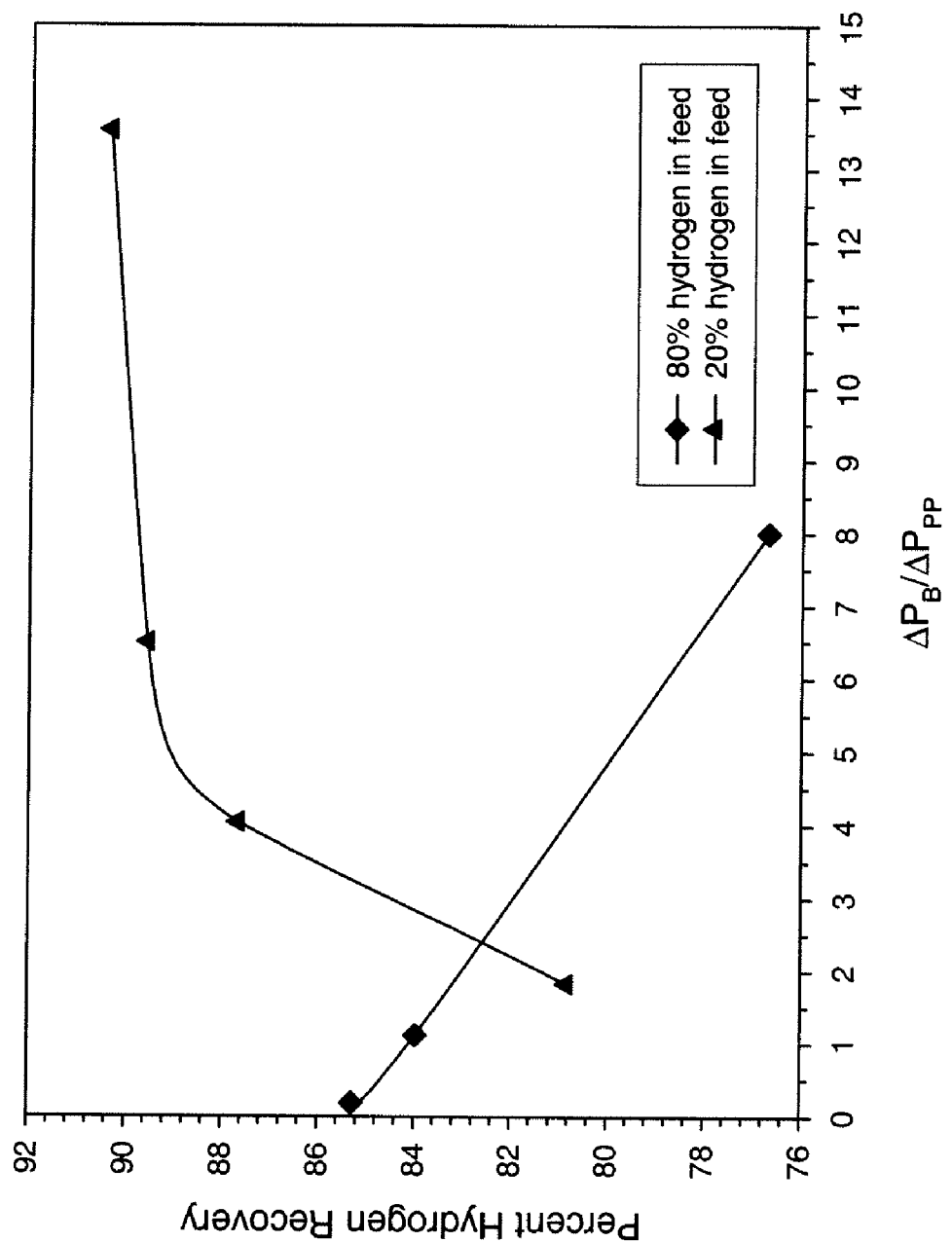
FIG. 5 is a plot of percent hydrogen recovery as a function of the ratio of the pressure decrease during the blowdown step and the pressure decrease during the provide purge step for a system having six adsorption beds and two equalization steps.

FIG. 5 presents results of the computational simulations for feed gas mixtures comprising 80% hydrogen showing percent hydrogen recovery as a function of the ratio of pressure decrease during the blowdown step to the pressure decrease

TABLE 7

| A  | A  | A  | A  | A  | A | 1 | 2  | PP | B  | B  | P  | I  | 2' | I  | 1' | R | R  |
|----|----|----|----|----|---|---|----|----|----|----|----|----|----|----|----|---|----|
| 1' | R  | R  | A  | A  | A | A | A  | A  | 1  | 2  | PP | B  | B  | P  | I  | 2'| I  |
| I  | 2' | I  | 1' | R  | R | A | A  | A  | A  | A  | A  | 1  | 2  | PP | B  | B | P  |
| B  | B  | P  | I  | 2' | I | 1'| R  | R  | A  | A  | A  | A  | A  | 1  | 2  | PP|    |
| 1  | 2  | PP | B  | B  | P | I | 2' | I  | 1' | R  | R  | A  | A  | A  | A  | A | A  |
| A  | A  | A  | 1  | 2  | PP| B | B  | P  | I  | 2' | I  | 1' | R  | R  | A  | A | A  |

As in Example 1, computational simulations were performed. Valve operation for the various steps is similar to that described in Example 1.

For purposes of comparison, simulations for two different feed gas mixtures are presented. Results of simulations using a feed gas mixture comprising 80% hydrogen, 19.7% methane and 0.3% nitrogen are presented to illustrate expected trends for processing feed gas mixtures having high hydrogen concentrations. Results of simulations using a feed gas mixture comprising 20% hydrogen, 78.6% methane and 1.4% nitrogen are presented to illustrate trends discovered by the inventors for processing feed gas mixtures having low hydrogen concentrations.

In the simulations, the valve setting for the bed providing purge gas was adjusted to vary the ratio of the pressure decrease during the provide purge step for the six adsorption bed system utilizing the cycle in Table 7. The results show the expected trend that the hydrogen recovery decreases as the ratio of pressure decrease during the blowdown step to the pressure decrease during the provide purge step increases. The hydrogen recovery decreases from about 85% at a ratio of about 0.6 down to a hydrogen recovery less than 80% at a ratio of about 5.

TABLE 8

| | Step | | | | | | | | | |
|---|---|---|---|---|---|---|---|---|---|---|
| Case | A | 1 | 2 | PP | B | P | 2' | 1' | R | $\left(\frac{\Delta P_B}{\Delta P_{PP}}\right)$ |
| 1 | 1.48 | 1.09 | 0.57 | 0.41 | 0.13 | 0.13 | 0.56 | 1.1 | 1.44 | 1.8 |
| 2 | 1.48 | 1.09 | 0.57 | 0.48 | 0.13 | 0.14 | 0.56 | 1.1 | 1.44 | 4.0 |
| 3 | 1.48 | 1.09 | 0.57 | 0.51 | 0.13 | 0.14 | 0.56 | 1.1 | 1.44 | 6.5 |
| 4 | 1.48 | 1.09 | 0.57 | 0.54 | 0.14 | 0.14 | 0.56 | 1.1 | 1.44 | 13.5 |

This finding is consistent with prior art with six adsorption beds. For example, U.S. Pat. No. 4,482,361 to Whysall discloses a ratio of pressure decrease during the blowdown step to the pressure decrease during the provide purge of 0.37.

FIG. 5 also presents results of the simulations for feed gas mixtures comprising 20% hydrogen showing percent hydrogen recovery as a function of the ratio of pressure decrease during the blowdown step to the pressure decrease during the provide purge step for the six adsorption bed system utilizing the cycle in Table 7. The results show that the hydrogen recovery is above 80% for a ratio greater than 2. The hydrogen recovery increases above 88% for a ratio greater than about 5.

In contrast to the results for the feed gas mixtures comprising 80% hydrogen, the results for the feed gas mixtures comprising 20% hydrogen show that the hydrogen recovery increases as the ratio of pressure decrease during the blowdown step to the pressure decrease during the provide purge step increases.

The computational simulations illustrate the desirability to increase the ratio of pressure decrease during the blowdown step to the pressure decrease during the provide purge step for feed gas mixtures comprising low concentrations of hydrogen. The simulations show that for an adsorption system having 6 adsorption bed and a cycle having 2 equalization steps, a ratio greater than about 2 is desired for hydrogen recovery greater than 80%, a ratio greater than 3 is desired for hydrogen recovery greater than 87%, and a ratio greater than about 5 is desired for a hydrogen recovery greater than 89%.

Comparing these results to Example 2, the required ratio is lower for 6 adsorption beds than for 5 adsorption beds to provide the same hydrogen recovery.

EXAMPLE 5

Table 9 shows a cycle chart for a six adsorption bed system that can be used in accordance with the process described herein and used in the simulations presented in Example 5. In this six bed example, the adsorption beds undergo an adsorption step, a first pressure equalization by void gas withdrawal step, a second pressure equalization by void gas withdrawal step, a third pressure equalization by void gas withdrawal step, an idle step, a provide purge step, a blowdown step, a purge step, a third pressure equalization by void gas introduction step, a second idle step, a second pressure equalization by void gas introduction step, a third idle step, a first pressure equalization by void gas introduction step with hydrogen-rich product gas assistance, and a repressurization step. According to the example cycle in Table 9, the provide purge step follows the third pressure equalization by void gas withdrawal step.

As in Example 1, computational simulations were performed. Valve operation for the various steps is similar to that described in Example 1.

For purposes of comparison, simulations for two different feed gas mixtures are presented. Results of simulations using a feed gas mixture comprising 80% hydrogen, 19.7% methane and 0.3% nitrogen are presented to illustrate expected trends for processing feed gas mixtures having high hydrogen concentrations. Results of simulations using a feed gas mixture comprising 20% hydrogen, 78.6% methane and 1.4% nitrogen are presented to illustrate trends discovered by the inventors for processing feed gas mixtures having low hydrogen concentrations.

In the simulations, the valve setting for the bed providing purge gas was adjusted to vary the ratio of the pressure decrease during the blowdown step to the pressure decrease during the provide purge step. For each simulation, the final blowdown pressure was set at about 135 kPa. The approach pressure on the equalization steps was set at about 10 kPa. As part of the solution of the simulation, the pressure at the end of each equalization step was determined.

Pressure at the end of each step for four cases with feed gas mixtures comprising 20% hydrogen are given in Table 10. The pressure units are MPa. The ratio of pressure decrease during the blowdown step to the pressure decrease during the provide purge step, $$\left(\frac{\Delta P_B}{\Delta P_{PP}}\right),$$

is also listed.

Figure 6:
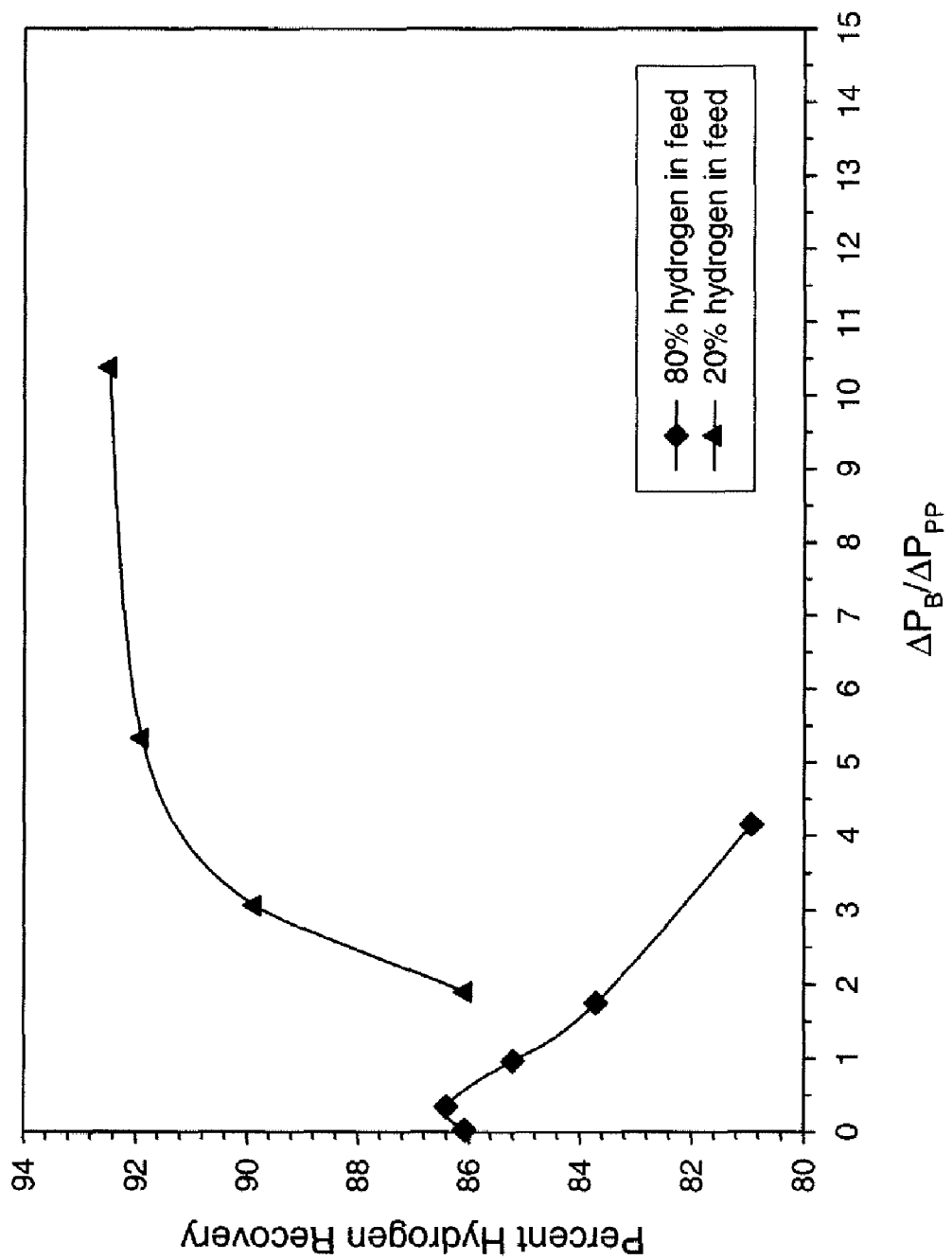
FIG. 6 is a plot of percent hydrogen recovery as a function of the ratio of the pressure decrease during the blowdown step and the pressure decrease during the provide purge step for a system having six adsorption beds and three equalization steps.

FIG. 6 presents results of the computational simulations for feed gas mixtures comprising 80% hydrogen showing percent hydrogen recovery as a function of the ratio of pressure decrease during the blowdown step to the pressure decrease during the provide purge step for the six adsorption bed system utilizing the cycle in Table 9. The results show the expected trend that the hydrogen recovery decreases as the ratio of pressure decrease during the blowdown step to the pressure decrease during the provide purge step increases. The hydrogen recovery decreases from about 86% at a ratio of about 0.5 down to a hydrogen recovery less than 82% at a ratio of about 3.

FIG. 6 also presents results of the simulations for feed gas mixtures comprising 20% hydrogen showing percent hydrogen recovery as a function of the ratio of pressure decrease during the blowdown step to the pressure decrease during the provide purge step for the six adsorption bed system utilizing the cycle in Table 9. The results show that the hydrogen

TABLE 9

| A  | A  | A  | A  | 1  | 2  | 3  | I  | PP | PP | B  | B  | P  | P  | 3' | I  | I  | 2' | I  | I  | 1' | R  | R  | R  |
|----|----|----|----|----|----|----|----|----|----|----|----|----|----|----|----|----|----|----|----|----|----|----|----|
| I  | 2' | I  | I  | 1' | R  | R  | R  | A  | A  | A  | A  | 1  | 2  | 3  | I  | PP | PP | B  | B  | P  | P  | 3' | I  |
| 1  | 2  | 3  | I  | PP | PP | B  | B  | P  | P  | 3' | I  | I  | 2' | I  | I  | 1' | R  | R  | R  | A  | A  | A  | A  |
| P  | P  | 3' | I  | I  | 2' | I  | I  | 1' | R  | R  | R  | A  | A  | A  | A  | 1  | 2  | 3  | I  | PP | PP | B  | B  |
| 1' | R  | R  | R  | A  | A  | A  | A  | 1  | 2  | 3  | I  | PP | PP | B  | B  | P  | P  | 3' | I  | I  | 2' | I  | I  |
| PP | PP | B  | B  | P  | P  | 3' | I  | I  | 2' | I  | I  | 1' | R  | R  | R  | A  | A  | A  | A  | 1  | 2  | 3  | I  | recovery is above 86% for a ratio greater than 2. The hydrogen recovery increases above 90% for a ratio greater than about 3.

TABLE 10

| | Step | | | | | | | | | | | |
|---|---|---|---|---|---|---|---|---|---|---|---|---|
| Case | A | 1 | 2 | 3 | PP | B | P | 3' | 2' | 1' | R | $\left(\frac{\Delta P_B}{\Delta P_{PP}}\right)$ |
| 1 | 1.48 | 1.15 | 0.76 | 0.43 | 0.32 | 0.13 | 0.13 | 0.42 | 0.75 | 1.1 | 1.44 | 1.9 |
| 2 | 1.48 | 1.15 | 0.76 | 0.43 | 0.35 | 0.13 | 0.14 | 0.42 | 0.75 | 1.1 | 1.44 | 3.1 |
| 3 | 1.48 | 1.15 | 0.76 | 0.43 | 0.38 | 0.13 | 0.14 | 0.42 | 0.75 | 1.1 | 1.44 | 5.3 |
| 4 | 1.48 | 1.15 | 0.76 | 0.43 | 0.40 | 0.13 | 0.14 | 0.41 | 0.75 | 1.1 | 1.44 | 10.4 |

In contrast to the results for the feed gas mixtures comprising 80% hydrogen, the results for the feed gas mixtures comprising 20% hydrogen show that the hydrogen recovery increases as the ratio of pressure decrease during the blowdown step to the pressure decrease during the provide purge step increases.

The computational simulations illustrate the desirability to increase the ratio of pressure decrease during the blowdown step to the pressure decrease during the provide purge step for feed gas mixtures comprising low concentrations of hydrogen. The simulations show that for an adsorption system having 6 adsorption bed and a cycle having 3 equalization steps, a ratio greater than about 2 is desired for hydrogen recovery greater than 86%, a ratio greater than 3 is desired for hydrogen recovery greater than 90%, and a ratio greater than about 5 is desired for a hydrogen recovery greater than 92%.

While the invention has been described in detail and with reference to specific examples thereof, it will be apparent to one skilled in the art that various changes and modifications can be made which are within the scope of the appended claims.

The invention claimed is:

1. A process for selectively separating hydrogen from at least one more strongly adsorbable component in a plurality of adsorption beds each containing an adsorbent selective for the at least one more strongly adsorbable component to produce a hydrogen-rich product gas, each of the plurality of adsorption beds subjected to a repetitive cycle, the process comprising:
   (a) an adsorption step for producing the hydrogen-rich product from a feed gas mixture comprising 5% to 50% hydrogen;
   (b) at least two pressure equalization by void space gas withdrawal steps;
   (c) a provide purge step resulting in a first pressure decrease $\Delta P_1$;
   (d) a blowdown step resulting in a second pressure decrease $\Delta P_2$;
   (e) a purge step;
   (f) at least two pressure equalization by void space gas introduction steps; and
   (g) a repressurization step;
wherein $$\frac{\Delta P_2}{\Delta P_1} \geq 2.0.$$

2. The process of claim 1 wherein the feed gas mixture comprises 5% to 40% hydrogen.

3. The process of claim 1 wherein the feed gas mixture comprises 5% to 30% hydrogen.

4. The process of claim 1 wherein $$\frac{\Delta P_2}{\Delta P_1} \geq 3.0.$$

5. The process of claim 1 wherein the blowdown step is to a blowdown pressure wherein the blowdown pressure is 108 kPa to 170 kPa.

6. The process of claim 1 wherein at least one of the at least two pressure equalization by void space gas introduction steps is a pressure equalization by void space gas introduction step with hydrogen-rich product gas assistance.

7. The process of claim 1 wherein the process comprises at least three pressure equalization by void space gas withdrawal steps and at least three pressure equalization by void space gas introduction steps.

8. The process of claim 7 wherein $$\frac{\Delta P_2}{\Delta P_1} \geq 4.0.$$

9. A process for selectively separating hydrogen from at least one more strongly adsorbable component in a plurality of adsorption beds each containing an adsorbent selective for the at least one more strongly adsorbable component to produce a hydrogen-rich product gas, each of the plurality of adsorption beds subjected to a repetitive cycle, the process comprising:
   (a) introducing a feed gas mixture comprising 5% to 50% hydrogen at an elevated pressure into a first adsorption bed of the plurality of adsorption beds and adsorbing the at least one more strongly adsorbable component on the adsorbent in the first adsorption bed while withdrawing the hydrogen-rich product gas from the first adsorption bed, thereafter leaving a first void space gas in the first adsorption bed substantially at the elevated pressure;
   (b) co-currently withdrawing a first portion of the first void space gas from the first adsorption bed and passing the first portion of the first void space gas to a second adsorption bed of the plurality of adsorption beds for pressure equalization;
   (c) co-currently withdrawing a second portion of the first void space gas from the first adsorption bed and passing the second portion of the first void space gas to a third adsorption bed of the plurality of adsorption beds to purge the third adsorption bed with the second portion of the first void space gas resulting in a first pressure decrease in the first adsorption bed from a first pressure $P_1$ to a second pressure $P_2$;

(d) co-currently withdrawing a third portion of the first void space gas from the first adsorption bed and passing the third portion of the first void space gas to one of the third adsorption bed and a fourth adsorption bed of the plurality of adsorption beds for pressure equalization;

(e) counter-currently withdrawing a fourth portion of the first void space gas from the first adsorption bed resulting in a second pressure decrease in the first adsorption bed from the second pressure $P_2$ or a third pressure $P_3$ to a blowdown pressure $P_4$;

wherein $$\frac{(P_2 - P_4)}{(P_1 - P_2)} \geq 2.0$$

when the second pressure decrease in the first adsorption bed is from the second pressure $P_2$ to the blowdown pressure $P_4$, and $$\frac{(P_3 - P_4)}{(P_1 - P_2)} \geq 2.0$$

when the second pressure decrease in the first adsorption bed is from the third pressure $P_3$ to the blowdown pressure $P_4$;

(f) counter-currently introducing a first portion of a second void space gas into the first adsorption bed for purging the first adsorption bed, the second void space gas from one of a fifth adsorption bed of the plurality of adsorption beds, the second adsorption bed, the third adsorption bed, and the fourth adsorption bed;

(g) counter-currently introducing a second portion of the second void space gas or a portion of a third void space gas into the first adsorption bed from one of a sixth adsorption bed of the plurality of adsorption beds, the second adsorption bed, the third adsorption bed, the fourth adsorption bed and the fifth adsorption bed for pressure equalization;

(h) counter-currently introducing a portion of a fourth void space gas into the first adsorption bed, the fourth void space gas from one of a seventh adsorption bed of the plurality of adsorption beds, the second adsorption bed, the third adsorption bed, the fourth adsorption bed, the fifth adsorption bed and the sixth adsorption bed for pressure equalization; and (i) at least one of co-currently introducing the feed gas mixture and counter-currently introducing the hydrogen-rich product gas from at least one of a hydrogen-rich product gas storage vessel, an eighth adsorption bed of the plurality of adsorption beds, the second adsorption bed, the third adsorption bed, the fourth adsorption bed, the fifth adsorption bed and the sixth adsorption bed into the first adsorption bed until the first adsorption bed is substantially at the elevated pressure.

10. The process of claim 9 wherein the feed gas mixture comprises 5% to 40% hydrogen.

11. The process of claim 9 wherein the feed gas mixture comprises 5% to 30% hydrogen.

12. The process of claim 9 wherein withdrawing the second portion of the void space gas is prior to withdrawing the third portion of the void space gas.

13. The process of claim 9 wherein withdrawing the third portion of the void space gas is prior to withdrawing the second portion of the void space gas.

14. The process of claim 9 wherein $P_4$ is 108 kPa to 170 kPa.

15. The process of claim 9 wherein $$\frac{(P_2 - P_4)}{(P_1 - P_2)} \geq 3.0$$

when the second pressure decrease in the first adsorption bed is from the second pressure $P_2$ to the blowdown pressure $P_4$ and $$\frac{(P_3 - P_4)}{(P_1 - P_2)} \geq 3.0$$

when the second pressure decrease in the first adsorption bed is from the third pressure $P_3$ to the blowdown pressure $P_4$.

16. The process of claim 9 further comprising counter-currently introducing the hydrogen-rich product gas from at least one of the second adsorption bed, the third adsorption bed, the fourth adsorption bed, the fifth adsorption bed, the sixth adsorption bed and the eighth adsorption bed into the first adsorption bed simultaneously with the counter-current introducing of the second portion of the second void space gas or the portion of the third void space gas into the first adsorption bed for pressure equalization with hydrogen-rich product gas assistance.

17. The process of claim 16 wherein the hydrogen-rich gas for pressure equalization with hydrogen-rich product gas assistance is from at least one of the third adsorption bed and the fourth adsorption bed.

18. The process of claim 9 wherein the second void space gas is from one of the fourth adsorption bed and the fifth adsorption bed.

19. The process of claim 9 wherein the third void space gas is from one of the second adsorption bed, the fourth adsorption bed, and the sixth adsorption bed.

20. The process of claim 9 wherein the fourth void space gas is from one of the second adsorption bed, the fourth adsorption bed and the sixth adsorption bed.

21. The process of claim 9 wherein the hydrogen-rich product gas introduced into the first adsorption bed is from at least one of the third adsorption bed and the fourth adsorption bed.

22. The process of claim 9 wherein the second void space gas is from one of the fourth adsorption bed and the fifth adsorption bed, wherein the third void space gas is from one of the second adsorption bed, the fourth adsorption bed, and the sixth adsorption bed, wherein the fourth void space gas is from one of the second adsorption bed, the fourth adsorption bed and the sixth adsorption bed, and wherein the hydrogen-rich product gas introduced into the first adsorption bed is from at least one of the third adsorption bed and the fourth adsorption bed.

23. The process of claim 9 further comprising:

(j) co-currently withdrawing a fifth portion of the first void space gas from the first adsorption bed and passing the fifth portion of the first void space gas to one of the third adsorption bed and the sixth adsorption bed for pressure equalization; and (k) counter-currently introducing a portion of a fifth void space gas into the first adsorption bed, the fifth void space gas from one of a ninth adsorption bed of the plurality of adsorption beds, the second adsorption bed, the third adsorption bed, the fourth adsorption bed, the fifth adsorption bed, the sixth adsorption bed, the seventh adsorption bed and the eighth adsorption bed for pressure equalization.

24. The process of claim 23 wherein the fifth void space gas is from one of the second adsorption bed and the third adsorption bed.

25. The process of claim 23 wherein $$\frac{(P_2 - P_4)}{(P_1 - P_2)} \geq 4.0$$

when the second pressure decrease in the first adsorption bed is from the second pressure $P_2$ to the blowdown pressure $P_4$ and $$\frac{(P_3 - P_4)}{(P_1 - P_2)} \geq 4.0$$

when the second pressure decrease in the first adsorption bed is from the third pressure $P_3$ to the blowdown pressure $P_4$.

* * * * *